US012337835B2

(12) United States Patent
Li et al.

(10) Patent No.: US 12,337,835 B2
(45) Date of Patent: *Jun. 24, 2025

(54) POLYLINE CONTOUR REPRESENTATIONS FOR AUTONOMOUS VEHICLES

(71) Applicant: Waymo LLC, Mountain View, CA (US)

(72) Inventors: Dong Li, Los Gatos, CA (US); Ioan-Alexandru Sucan, East Palo Alto, CA (US); Victor Puchkarev, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/588,333

(22) Filed: Feb. 27, 2024

(65) Prior Publication Data

US 2024/0190423 A1 Jun. 13, 2024

Related U.S. Application Data

(63) Continuation of application No. 17/386,113, filed on Jul. 27, 2021, now Pat. No. 11,938,926, which is a (Continued)

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0953* (2013.01); *B60W 30/0956* (2013.01);
(Continued)

(58) Field of Classification Search
CPC ............. B60W 30/09; B60W 30/0953; B60W 30/0956; B60W 40/12; B60W 2554/00;
(Continued)

(56) References Cited

U.S. PATENT DOCUMENTS

| 5,587,938 A | 12/1996 | Hoetzel |
| 6,144,338 A | 11/2000 | Davies |

(Continued)

FOREIGN PATENT DOCUMENTS

| CN | 103692973 A | 4/2014 |
| CN | 104787046 A | 7/2015 |

(Continued)

OTHER PUBLICATIONS

A. Vatavu, S. Nedevschi and F. Oniga, Real Time Object Delimiters Extraction For Environment Representation In Driving Scenarios, ICINCO, 2009, pp. 86-93.

(Continued)

*Primary Examiner* — Michael D Lang
(74) *Attorney, Agent, or Firm* — Botos Churchill IP Law

(57) ABSTRACT

Aspects of the disclosure relate to controlling a vehicle having an autonomous driving mode or an autonomous vehicle. For instance, a polygon representative of the shape and location of a first object may be received. A polyline contour representation of a portion of a polygon representative of the shape and location of a second object may be received. The polyline contour representation may be in half-plane coordinates and including a plurality of vertices and line segments. Coordinates of the polygon representative of the first object may be converted to the half-plane coordinate system. A collision location between the polyline contour representation and the polygon representative of the first object may be determined using the converted coordinates. The autonomous vehicle may be controlled in the autonomous driving mode to avoid a collision based on the collision location.

20 Claims, 25 Drawing Sheets

Related U.S. Application Data continuation of application No. 16/688,017, filed on Nov. 19, 2019, now Pat. No. 11,260,857, and a continuation of application No. 16/687,974, filed on Nov. 19, 2019, now Pat. No. 11,136,025.

(60) Provisional application No. 62/889,698, filed on Aug. 21, 2019.

(51) Int. Cl.
| | |
|---|---|
| *B60W 40/12* | (2012.01) |
| *G05D 1/00* | (2024.01) |
| *G05D 1/227* | (2024.01) |
| *G05D 1/646* | (2024.01) |
| *G06V 10/44* | (2022.01) |
| *G06V 20/58* | (2022.01) |

(52) U.S. Cl.
CPC ......... *B60W 40/12* (2013.01); *G05D 1/0088* (2013.01); *G05D 1/0212* (2013.01); *G05D 1/227* (2024.01); *G05D 1/646* (2024.01); *G06V 10/44* (2022.01); *G06V 20/58* (2022.01); *B60W 2422/90* (2013.01); *B60W 2554/00* (2020.02)

(58) Field of Classification Search
CPC ... B60W 2422/90; G06V 20/58; G06V 10/44; G05D 1/227; G05D 1/646; G05D 1/0088; G05D 1/0212

See application file for complete search history.

(56) References Cited

U.S. PATENT DOCUMENTS

| | | | |
|---|---|---|---|
| 6,657,630 | B1 | 12/2003 | Kurosawa et al. |
| 8,762,046 | B2 | 6/2014 | Dorum et al. |
| 9,767,366 | B1 | 9/2017 | Fairfield et al. |
| 2012/0303258 | A1 | 11/2012 | Pampus et al. |
| 2014/0085466 | A1 | 3/2014 | Moriyama et al. |
| 2015/0203023 | A1 | 7/2015 | Marti et al. |
| 2015/0353133 | A1 | 12/2015 | Mukai |
| 2018/0059682 | A1 | 3/2018 | Thode |
| 2018/0261094 | A1 | 9/2018 | Nishimura et al. |
| 2019/0146498 | A1 | 5/2019 | Balachandran et al. |
| 2019/0217857 | A1 | 7/2019 | Sorin et al. |
| 2019/0311205 | A1 | 10/2019 | Mittal et al. |
| 2021/0053563 | A1 | 2/2021 | Li et al. |

FOREIGN PATENT DOCUMENTS

| | | |
|---|---|---|
| JP | 2018041244 A | 3/2018 |
| KR | 20190095622 A | 8/2019 |
| WO | 2015176933 A1 | 11/2015 |
| WO | 2015187829 A1 | 12/2015 |
| WO | 2017079349 A1 | 5/2017 |
| WO | 2018061613 A1 | 4/2018 |

OTHER PUBLICATIONS

Brual Shah, Dissertation: Planning for Autonomous Operation of Unmanned Surface Vehicles, 2016, pp. 1-207, Submitted to the Faculty of the Graduate School of the University of Maryland, College Park.

International Search Report and Written Opinion for Application No. PCT/US2020/046787 dated Nov. 23, 2020.

Office Action issued in corresponding Japanese Patent Application No. 2022-505657, mailed Mar. 20, 2023, 9 pages.

The Extended European Search Report for European Patent Application 20853988.2, Jul. 3, 2023, 9 Pages.

The First Office Action for Chinese Patent Application No. 202080058968.3, Sep. 28, 2022.

1700

2600

POLYLINE CONTOUR REPRESENTATIONS FOR AUTONOMOUS VEHICLES

CROSS REFERENCE TO RELATED APPLICATION

The present application is a continuation of U.S. patent application Ser. No. 17/386,113, filed Jul. 27, 2021, which is a continuation of U.S. patent application Ser. No. 16/687,974, filed Nov. 19, 2019, issued as U.S. Pat. No. 11,136,025, and U.S. patent application Ser. No. 16/888,017, filed Nov. 19, 2019, issued as U.S. Pat. No. 11,260,857, both applications claim the benefit of the filing date of U.S. Provisional Application No. 62/889,698, filed Aug. 21, 2019, the entire disclosures of which are incorporated by reference herein.

BACKGROUND

Autonomous vehicles, such as vehicles which do not require a human driver when operating in an autonomous driving mode, may be used to aid in the transport of passengers or items from one location to another. An important component of an autonomous vehicle is the perception system, which allows the autonomous vehicle to perceive and interpret its surroundings using various sensors such as cameras, radar, lasers, and other similar devices. For example, autonomous vehicles may use the sensors to gather and interpret images and sensor data about its surrounding environment, e.g., parked cars, trees, buildings, etc. Information from the perception system may be used by these vehicles to react to their surroundings by making numerous decisions while the autonomous vehicle is in motion, such as speeding up, slowing down, stopping, turning, etc.

Typically, when determining how to react to its surroundings, an autonomous vehicle's contour is often modeled by a rectangle (when viewed from the top-down) or a three-dimensional rectangle, which bounds all of the physical aspects of the autonomous vehicle including all of the autonomous vehicle's sensors and mirrors. The swept volume of the autonomous vehicle can be determined by approximating the planned path or planned trajectory of the autonomous vehicle as a series of connected boxes each representing the location of the autonomous vehicle at a different time that are connected to one another. However, this approach may introduce false positive collisions, especially at the corners of the autonomous vehicle as the autonomous vehicle itself is not a perfect rectangle. At the same time, if a more complex polygon is used, such a representation may be computationally expensive when analyzing potential collisions with other objects in the autonomous vehicle's planned trajectory.

SUMMARY

One aspect of the disclosure provides a method of controlling a vehicle having an autonomous driving mode. The method includes receiving a polygon representative of the shape and location of an object detected in an environment of the autonomous vehicle; accessing a polyline contour representation of the autonomous vehicle representing no more than half of a contour of the autonomous vehicle in a half-plane coordinate system, the polyline contour representation including a plurality of vertices and line segments; converting coordinates of the polygon representative of the object to the half-plane coordinate system; determining a collision location between the polyline contour representation and the polygon representative of the object using the converted coordinates; and controlling the autonomous vehicle in the autonomous driving mode to avoid a collision with the object based on the collision location.

In one example, the polyline contour representation is defined as a vehicle width profile drawn from the autonomous vehicle's front bumper to the autonomous vehicle's rear bumper. In this example, the polyline contour representation has at most two consecutive points that has the maximum y coordinate which is the autonomous vehicle's maximum half width. In addition, the autonomous vehicle's maximum half width corresponds to half of a width of the autonomous vehicle measured between the autonomous vehicle's mirrors or lateral sensors. In addition or alternatively, wherein a y coordinate value on the polyline contour representation monotonically increases to a point with a maximum y coordinate, then monotonically decreases such that the polyline contour representation has at most one peak. In this example, determining the collision location between the polyline contour representation and the representation of the object includes using a front fending polyline contour representation when the autonomous vehicle is moving forward, wherein the front fending polyline contour representation corresponds to a portion of the polyline contour representation in front of the maximum y coordinate. Alternatively, determining the collision location between the polyline contour representation and the representation of the object includes using a rear fending polyline contour representation when the autonomous vehicle is moving in reverse, wherein the rear fending polyline contour representation corresponds to a portion of the polyline contour representation after the maximum y coordinate.

In another example, determining the collision location includes, for a line segment of the polygon representative of the object determining a penetration point (D) into the half-plane coordinate system. In this example, the method also includes determining a distance between D and a line segment of the polyline contour representation. In addition or alternatively, the method also includes finding one of the line segments on the polyline contour representation that has a same penetration depth as D. In another example, when there are multiple collision locations between representation of the object and the polyline contour representation having a same y coordinate, determining the collision location further includes comparing an x coordinate for a first collision location to an x coordinate for a second collision location. In another example, the polyline contour representation corresponds to a width profile of the autonomous vehicle along a centerline of the autonomous vehicle. In another example, an origin of the half-plane coordinate system is located at a point corresponding to a furthest x coordinate on the autonomous vehicle's front bumper and the greatest y coordinate representing half of a width dimension of the autonomous vehicle. In another example, the collision location corresponds to one of the plurality of vertices or line segments. In another example, the method also includes determining a collision exit location between the polyline contour representation and the representation of the object, and wherein controlling the autonomous vehicle is further based on the collision exit location.

Another aspect of the disclosure provides a system for controlling a vehicle having an autonomous driving mode. The system includes one or more processors configured to receive a polygon representative of the shape and location of an object detected in an environment of the autonomous vehicle; access a polyline contour representation of the autonomous vehicle representing no more than half of a contour of the autonomous vehicle in a half-plane coordinate system, the polyline contour representation including a plurality of vertices and line segments; convert coordinates of the polygon representative of the object to the half-plane coordinate system; determine a collision location between the polyline contour representation and the polygon representative of the object using the converted coordinates; and control the autonomous vehicle in the autonomous driving mode to avoid a collision with the object based on the collision location.

In one example, determining the collision location includes, for a line segment of the polygon representative of the object determining a penetration point (D) into the half-plane coordinate system. In this example, the autonomous vehicle's maximum half width corresponds to half of a width of the autonomous vehicle measured between the autonomous vehicle's mirrors or lateral sensors. In addition, the polyline contour representation is defined as a vehicle width profile drawn from the autonomous vehicle's front bumper to the autonomous vehicle's rear bumper. In addition, the polyline contour representation has at most two consecutive points that has the maximum y coordinate which is the autonomous vehicle's maximum half width. In addition, a y coordinate value on the polyline contour representation monotonically increases to a point with a maximum y coordinate, then monotonically decreases such that the polyline contour representation has at most one peak. In addition or alternatively, the system also includes the autonomous vehicle.

Another aspect of the disclosure provides a method of controlling a vehicle having an autonomous driving mode. The method includes receiving, by one or more processors, a polygon representative of the shape and location of an object detected in an environment of the autonomous vehicle; determining, by the one or more processors, a front polyline for the polygon representative of the object based on a heading of the object and an expected location of the object at a future point in time; converting, by the one or more processors, coordinates of the front polyline to the half-plane coordinate system; determining, by the one or more processors, an entry location and an exit location between the front polyline and a polygon representative of the object based on a planned future location of the autonomous vehicle and using the converted coordinates; and controlling, by the one or more processors, the autonomous vehicle in the autonomous driving mode to avoid a collision with the object based on the entry location and the exit location.

In one example, determining a rear polyline for the polygon representative of the object based on a heading of the object and a planned future location of the object at the future point in time; converting coordinates of the rear polyline to the half-plane coordinate system, determining a second entry location and a second exit location between the rear polyline and the polygon representative of the object based on a planned future location of the autonomous vehicle at the future and the converted coordinates, and controlling the autonomous vehicle is further based on the second entry location and the second exit location. In this example, the method also includes determining a first distance by taking the minimum of an x-coordinate value of the entry location and the second entry location, and wherein controlling the autonomous vehicle is further based on the first distance. In addition, the method also includes determining a second distance by taking the maximum of an x-coordinate value of the exit location and the second exit location, and wherein controlling the autonomous vehicle is further based on the first distance. In addition, the method also includes using the first distance and the second distance to determine a probability of overlap with the object at the future point in time, and wherein controlling the autonomous vehicle is further based on the first distance. In addition, the method also includes receiving an uncertainty value associated with the expected future location of the object, and wherein determining the probability of overlap is further based on the uncertainty value. In addition or alternatively, the method also includes receiving a standard deviation for an uncertainty value associated with the expected future location of the object, and using the standard deviation to determine the probability of overlap as a cumulative distribution function. In addition or alternatively, the method also includes receiving a standard deviation for an uncertainty value associated with the expected future location of the object, and determine the probability of overlap as a cumulative distribution function between the first distance divided by the standard deviation and the second distance divided by the standard deviation. In another example, the method also includes determining the planned future location of the autonomous vehicle at the future point in time from a trajectory generated by a planning system of the autonomous vehicle. In another example, the method also includes determining the expected location of the object at the future point in time from a behavior modeling system of the autonomous vehicle.

Another aspect of the disclosure provides a system for controlling a vehicle having an autonomous driving mode. The system includes one or more processors configured to receive a polygon representative of the shape and location of an object detected in an environment of the autonomous vehicle; access a polygon representative of the autonomous vehicle; determine a front polyline for the polygon representative of the object based on a heading of the object and an expected location of the object at a future point in time; convert coordinates of the front polyline to the half-plane coordinate system; determine an entry location and an exit location between the front polyline and the polygon representative of the object based on a planned future location of the autonomous vehicle; and control the autonomous vehicle in the autonomous driving mode to avoid a collision with the object based on the entry location and the exit location.

In one example, the one or more processors are further configured to determine a rear polyline for the polygon representative of the object based on a heading of the object and a planned future location of the object at the future point in time; convert coordinates of the rear polyline to the half-plane coordinate system; determine a second entry location and a second exit location between the rear polyline and the polygon representative of the object based on a planned future location of the autonomous vehicle at the future, and to control the autonomous vehicle further based on the second entry location and the second exit location. In addition, wherein the one or more processors are further configured to determine a first distance by taking the minimum of an x-coordinate value of the entry location and the second entry location, and to control the autonomous vehicle further based on the first distance. In addition, the one or more processors are further configured to determine a second distance by taking the maximum of an x-coordinate value of the exit location and the second exit location, and to control the autonomous vehicle further based on the first distance. In addition, the one or more processors are further configured to use the first distance and the second distance to determine a probability of overlap with the object at the future point in time, and to control the autonomous vehicle further based on the first distance. In addition, the one or more processors are further configured to receive an uncertainty value associated with the expected future location of the object, and to determine the probability of overlap further based on the uncertainty value. In addition or alternatively, the one or more processors are further configured to receive a standard deviation for an uncertainty value associated with the expected future location of the object, and use the standard deviation to determine the probability of overlap as a cumulative distribution function. In addition or alternatively, the one or more processors are further configured to receive a standard deviation for an uncertainty value associated with the expected future location of the object and determine the probability of overlap as a cumulative distribution function between the first distance divided by the standard deviation and the second distance divided by the standard deviation. In another example, the one or more processors are further configured to determine the planned future location of the autonomous vehicle at the future point in time from a trajectory generated by a planning system of the autonomous vehicle and determine the expected location of the object at the future point in time from a behavior modeling system of the autonomous vehicle. In another example, the system also includes the autonomous vehicle.

Another aspect of the disclosure provides a method of controlling a vehicle having an autonomous driving mode. The method includes receiving, by one or more processors, a polygon representative of the shape and location of a first object; receiving, by the one or more processors, a polyline contour representation of a portion of a polygon representative of the shape and location of a second object, the polyline contour representation being in half-plane coordinates and including a plurality of vertices and line segments; converting, by the one or more processors, coordinates of the polygon representative of the first object to the half-plane coordinate system; determining, by the one or more processors, a collision location between the polyline contour representation and the polygon representative of the first object using the converted coordinates; and controlling, by the one or more processors, the autonomous vehicle in the autonomous driving mode to avoid a collision based on the collision location.

In one example, the first object is the autonomous vehicle, and the second object is an object in an environment of the autonomous vehicle. In another example, the second object is the autonomous vehicle, and the first object is an object in an environment of the autonomous vehicle. In another example, the collision location includes an entry location for the collision. In another example, the collision location includes an exit location for the collision.

Another aspect of the disclosure provides system for controlling a vehicle having an autonomous driving mode. The system includes one or more processors configured to receive a polygon representative of the shape and location of a first object; receive a polyline contour representation of a portion of a polygon representative of the shape and location of a second object, the polyline contour representation being in half-plane coordinates and including a plurality of vertices and line segments; convert coordinates of the polygon representative of the first object to the half-plane coordinate system; determine a collision location between the polyline contour representation and the polygon representative of the first object using the converted coordinates; and control the autonomous vehicle in the autonomous driving mode to avoid a collision based on the collision location.

In one example, the first object is the autonomous vehicle, and the second object is an object in an environment of the autonomous vehicle. In another example, the second object is the autonomous vehicle, and the first object is an object in an environment of the autonomous vehicle. In another example, the collision location includes an entry location for the collision. In another example, the collision location includes an exit location for the collision. In another example, the system also includes the autonomous vehicle.

Another aspect of the disclosure provides a non-transitory recording medium on which instructions are stored, the instructions, when executed by one or more processors, cause the one or more processors to perform a method of controlling a vehicle having an autonomous driving mode. The method includes receiving a polygon representative of the shape and location of a first object; receiving a polyline contour representation of a portion of a polygon representative of the shape and location of a second object, the polyline contour representation being in half-plane coordinates and including a plurality of vertices and line segments; converting coordinates of the polygon representative of the first object to the half-plane coordinate system; determining a collision location between the polyline contour representation and the polygon representative of the first object using the converted coordinates; and control the autonomous vehicle in the autonomous driving mode to avoid a collision based on the collision location.

In one example, the first object is the autonomous vehicle, and the second object is an object in an environment of the autonomous vehicle. In another example, the second object is the autonomous vehicle, and the first object is an object in an environment of the autonomous vehicle. In another example, the collision location includes an entry location for the collision. In another example, the collision location includes an exit location for the collision.

DETAILED DESCRIPTION

Overview

Figure 1:
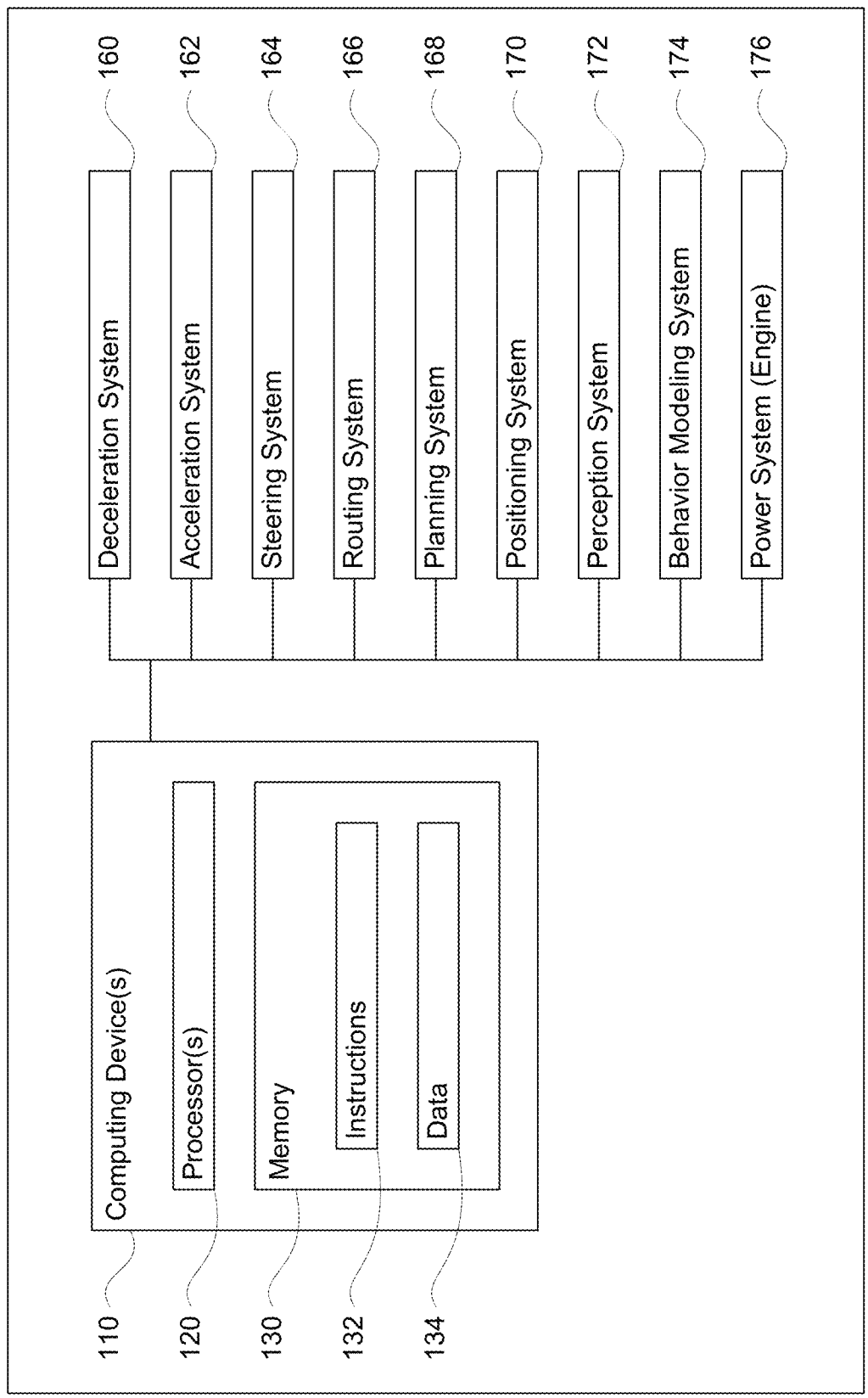
FIG. 1 is a functional diagram of an example vehicle in accordance with an exemplary embodiment.

The technology relates to representations of objects for collision analysis. When estimating potential collisions with other objects, the goal is typically to be conservative while doing so in order to promote safety. An autonomous vehicle's contour is often modeled by a rectangle (when viewed from the top-down) or a three-dimensional rectangle, which bounds all of the physical aspects of the autonomous vehicle including all of the autonomous vehicle's sensors and mirrors. The swept volume of the autonomous vehicle can be determined by approximating the planned path or planned trajectory of the autonomous vehicle as series of connected boxes each representing the location of the autonomous vehicle at a different time that are connected to one another. However, this approach may introduce false positive collisions, especially at the corners of the autonomous vehicle as the autonomous vehicle itself is not a perfect rectangle. At the same time, if a more complex polygon is used, such a representation may be computationally expensive when analyzing potential collisions with other objects on or in the autonomous vehicle's planned trajectory.

Rather than using a rectangle or a polygon, a polyline contour representation of the contours of the autonomous vehicle may be determined based on a vehicle's width profile. The polyline contour representation can be defined for each side of the autonomous vehicle split by a center-line of the autonomous vehicle. Because most vehicles are left-right symmetric along the center-line, the polyline contour representation need only actually define one side of or half of the autonomous vehicle, for instance, the left or right side. In this regard, if the other half of the autonomous vehicle is needed for collision analysis, the polyline contour representation can simply be inverted.

An example polyline contour representation may be defined as a vehicle width profile drawn from the autonomous vehicle's front bumper to the autonomous vehicle's rear bumper. The polyline contour representation has one, or at most two consecutive points that has the maximum y which is the autonomous vehicle's maximum half width. The y coordinate on the polyline contour representation monotonically increases to the point with maximum y, then monotonically decreases such that the polyline contour representation has at most one peak. The number of points selected for the polyline contour representation may be increased or decreased in order to increase or decrease accuracy of the collision analysis when using the polyline contour representation.

When the autonomous vehicle moves forward, objects can only collide with the half before the peak, and when the autonomous vehicle drives backward, objects can only collide with the half after the peak. As such, when performing a collision analysis, only the portion of the polyline contour representation before the peak is required when the autonomous vehicle is moving forward towards an object, and only the portion of the polyline contour representation after the peak is required when the autonomous vehicle is moving away from an object. In other words, when determining when the vehicle would start to have a collision with an object and the autonomous vehicle is driving forward, points on the polyline contour representation that are after the peak can be ignored, and when the autonomous vehicle is driving in reverse, points on the polyline contour representation that are before the peak can be ignored.

The polyline contour representation may be converted to half-plane coordinates for each of the portions of the polyline contour representation that are before the peak and after the peak. For instance, the autonomous vehicle may be placed at the right side of a half-plane. When reasoning the overlaps between the autonomous vehicle and an object, the front and rear bumpers or fending polyline contour representations may be slid forward and backward along the half-plane.

As the autonomous vehicle drives around, its perception system may detect and identify the shape and location of objects in the autonomous vehicle's environment. For instance, the perception system may provide location information and a polygon representative of the shape and location of the object. The polygon representative of the object may be in any coordinate system, for instance, latitude and longitude or a coordinate system of the autonomous vehicle or a sensor of the perception system.

When performing the collision analysis, the polygon representative of the object may be converted to the half-plane coordinate system using the location information. This may be done, for example, by finding the polygon's extreme points in half-plane's forward direction and perpendicular direction. Then a quarter of the polygon may be extracted and the polygon points of that quarter may be converted to half-plane coordinate.

Thereafter, a collision location for the representation of the object may be determined. A collision location may include an entry location and an exit location The entry location may correspond to a particular line segment of the polyline contour representation which would initially collide with the autonomous vehicle given the autonomous vehicle's current planned trajectory. In addition to determining the entry location the collision exit location may also be determined. While the entry location may identify where the autonomous vehicle will have a collision with an object, the exit location may identify how the autonomous vehicle can get out of the collision. This may be useful when a vehicle's computing devices decide to overtake an object's path. Once the entry location and collision exit location are determined, the autonomous vehicle's computing devices can use this information to determine how to better control the speed of the autonomous vehicle (e.g. drive faster or slower) in an autonomous driving mode in order to avoid the object.

As in the examples above, an object's contour is often modeled by a two-dimensional (2D) or three-dimensional (3D) polygon or a polygon representative of the object, which bounds all of the points for an object detected by an autonomous vehicle's perception system. A predicted trajectory for the object may also be determined by the behavior modeling system of the autonomous vehicle, for instance using various behavior modeling techniques as well as sensor data from the perception system for the object, other objects, as well as the autonomous vehicle's environment generally. A 2D or 3D path or planned trajectory for the object may be determined by moving the polygon representative of the object along the predicted trajectory. Modeling for collisions is typically done by determining a 2D or 3D path for the autonomous vehicle using the autonomous vehicle's future trajectory and determining whether it will intersect with the 2D or 3D path for the object.

However, due to uncertainty in the characteristics of the object from the perception system as well as the behavior modeling system, there may be significant lateral uncertainty related to the object's traveling direction. As such, the predicted trajectory for the object can be fairly inaccurate, resulting in possibly inaccurate collision determinations when comparing to the planned trajectory of the autonomous vehicle.

To address these shortcomings, the lateral uncertainty of an object may be modeled as a normal distribution with mean and standard deviation (sd) from the uncertainty output by the behavior modeling system. A probability of overlap with the planned trajectory of the autonomous vehicle may be determined. For instance, distances between the object and the planned trajectory of the autonomous vehicle may be determined by calculating the entry and exit distances between the object and the planned trajectory of the autonomous vehicle. The probability of overlap may be determined using a cumulative distribution function employing the entry and exit distances and standard deviation.

To determine the entry and exit distances, or rather, the position of the polygon representative of the object when it will potentially enter and exit the planned trajectory of the autonomous vehicle, the polygon of the object may be decomposed into front and rear polylines. To do so, the left-most and right-most points relative to the object's trajectory may be identified. This may be achieved using known techniques which may or may not include converting the coordinate system of the object to one that simplifies the identifications. From these left-most and right-most points, the polygon may be divided into front and rear polylines which may actually represent front and rear width profiles for the object. Each of the front and rear polylines may then be converted to half-plane coordinates.

Collision locations, or rather, an entry location and an exit location for each of the front and rear polylines may be determined. Each entry or exit location may correspond to a particular line segment of front or rear polyline which would collide with the autonomous vehicle given the autonomous vehicle's current trajectory. While the entry location may identify where the autonomous vehicle will have a collision with an object, the exit location may identify how the autonomous vehicle can get out of a collision with a trajectory of the object. An entry and/or exit location may correspond to a point on or a particular line segment of the polyline which would collide with the autonomous vehicle given the autonomous vehicle's current or a future trajectory. The entry and exit distances may then be determined from the entry and exit locations for the front and rear half planes. These values may then be used to determine the probability of overlap (e.g. a collision) at some location along the planned trajectory of the autonomous vehicle.

The aforementioned approach may also be useful in cases where the polygon for the autonomous vehicle overlaps with part of the object's lateral region. This may be useful when a vehicle's computing devices decide to avoid or even overtake an object. Once the probability of overlap is determined, the autonomous vehicle's computing devices can use this information to determine how to better control the speed of the autonomous vehicle in an autonomous driving mode in order to avoid the object. In some instances, the autonomous vehicle may even generate a new trajectory. The features described herein may provide an efficient, yet realistic representation of object for collision analysis. For instance, the features described herein may allow for an efficient and accurate method to compute the overlapping probability between an object and an autonomous vehicle's trajectory. In addition, in the case of a polyline representation of the autonomous vehicle, because the representation of the autonomous vehicle is not generalized to a coarse, two-dimensional rectangle that is larger than the actual dimensions of the autonomous vehicle, this can significantly reduce the swept volume of the autonomous vehicle, which in turn, may allow the autonomous vehicle to pass through more narrow passages and closer to other objects. As noted above, the goal of collision detection is ultimately to be conservative and detect any possible collision. However, using a polyline representation may allow for the calculation of larger distances between the autonomous vehicle and other objects, without compromising the nature of the conservative estimate.

In addition, because the polyline contour representation need only correspond to half of a vehicle and only a portion of that (before or after the peak) is needed when performing the collision analysis, this too can significantly reduce memory and processing resources. As described herein, the polyline contour representation also allows for a determination of which portion of the autonomous vehicle will be involved in a collision (e.g., collides with mirror or bumper) rather than simply a point on a rectangle which may or may not actually correspond to a physical point on the autonomous vehicle. Further, because the monotonicity of the y coordinate of the polyline contour representation, once it is known how deep an object overlaps with the autonomous vehicle's trajectory, which line segment to use for the collision analysis can be determined quickly.

In addition to vehicles and real-time decision making, the features described herein may also be useful for objects other than vehicles including virtual representations of objects, such as simulations including testing circumstances as well as video games. For instance, the features described herein may be used to determine collision locations, including entry locations and exit locations, for those virtual objects making the simulations themselves more efficient.

When used in conjunction with actual vehicles, because the polyline contour representation is more nuanced that a rectangular polygon representative of a vehicle or an object in the vehicle's environment, the features described herein may effectively increase the calculated distances between the autonomous vehicle and other objects which can also reduce the likelihood of false positive collisions with other objects, reduce the likelihood of a vehicle becoming stranded (unable to proceed) because it is falsely blocked by another object, and reduce occlusions caused by other objects as the autonomous vehicle may be able to get closer to or nudge around the object. All of these benefits, in turn, can enable the autonomous vehicle to better maneuver around objects, in some cases, drive faster, and also reduce the need for evasive (or otherwise uncomfortable) maneuvers which can improve overall driving comfort for passengers.

Example Systems

As shown in FIG. 1, a vehicle 100 in accordance with one aspect of the disclosure includes various components. While certain aspects of the disclosure are particularly useful in connection with specific types of vehicles, the autonomous vehicle may be any type of vehicle including, but not limited to, cars, trucks, motorcycles, buses, recreational vehicles, etc. The autonomous vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein.

The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

In one aspect the computing devices 110 may be part of an autonomous control system capable of communicating with various components of the autonomous vehicle in order to control the autonomous vehicle in an autonomous driving mode. For example, returning to FIG. 1, the computing devices 110 may be in communication with various systems of vehicle 100, such as deceleration system 160, acceleration system 162, steering system 164, routing system 166, planning system 168, positioning system 170, perception system 172, behavior modeling system 174, and power system 176 in order to control the movement, speed, etc. of vehicle 100 in accordance with the instructions 132 of memory 130 in the autonomous driving mode.

As an example, computing devices 110 may interact with deceleration system 160 and acceleration system 162 in order to control the speed of the autonomous vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the autonomous vehicle.

Planning system 168 may be used by computing devices 110 in order to determine and follow a route generated by a routing system 166 to a location. For instance, the routing system 166 may use map information to determine a route from a current location of the autonomous vehicle to a drop off location. The planning system 168 may periodically generate trajectories, or short-term plans for controlling the autonomous vehicle for some period of time into the future, in order to follow the route (a current route of the autonomous vehicle) to the destination. In this regard, the planning system 168, routing system 166, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

The map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the autonomous vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the autonomous vehicle. The location of the autonomous vehicle may include an absolute geographical location, such as latitude, longitude, and altitude as well as relative location information, such as location relative to other cars immediately around it which can often be determined with less noise that absolute geographical location.

The positioning system 170 may also include other devices in communication with the computing devices of the computing devices 110, such as an accelerometer, gyroscope or another direction/speed detection device to determine the direction and speed of the autonomous vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 2:
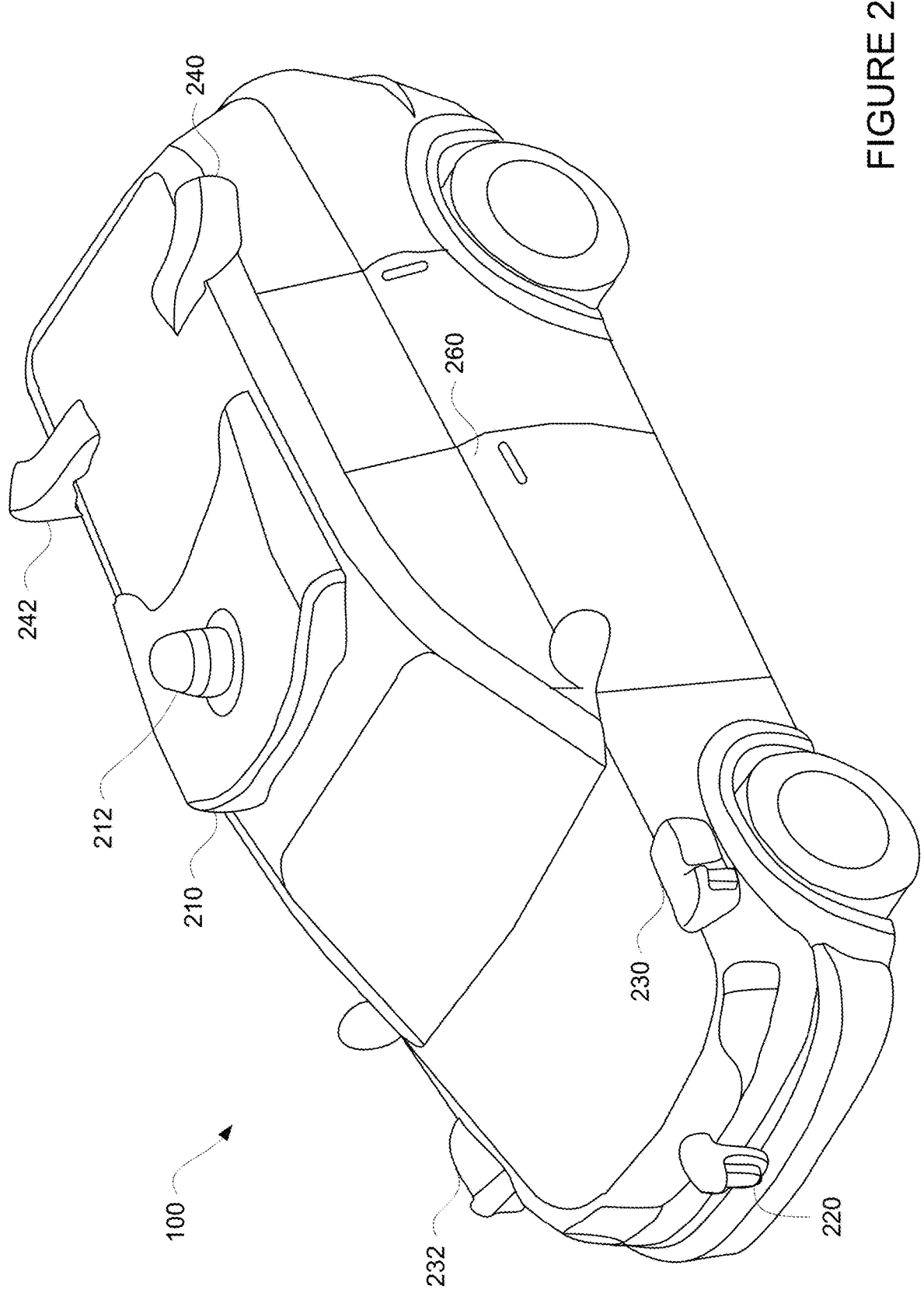
FIG. 2 is an example external view of a vehicle in accordance with aspects of the disclosure.

The perception system 172 also includes one or more components for detecting objects external to the autonomous vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the autonomous vehicle is a passenger vehicle such as a minivan, the minivan may include a laser or other sensors mounted on the roof or other convenient location. For instance, FIG. 2 is an example external view of vehicle 100. In this example, roof-top housing 210 and dome housing 212 may include a LIDAR sensor as well as various cameras and radar units. In addition, housing 220 located at the front end of vehicle 100 and housings 230, 232 on the driver's and passenger's sides of the autonomous vehicle may each store a LIDAR sensor. For example, housing 230 is located in front of driver door 260. Vehicle 100 also includes housings 240, 242 for radar units and/or cameras also located on the roof of vehicle 100. Additional radar units and cameras (not shown) may be located at the front and rear ends of vehicle 100 and/or on other positions along the roof or roof-top housing 210.

The computing devices 110 may be capable of communicating with various components of the autonomous vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 172, and power system 176 (i.e. the autonomous vehicle's engine or motor) in order to control the movement, speed, etc. of vehicle 100 in accordance with the instructions 132 of memory 130.

The various systems of the autonomous vehicle may function using autonomous vehicle control software in order to determine how to and to control the autonomous vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. For instance, the perception system 172 may provide a polygon, such as a 2D or 3D bounding box, representative of the object's shape and dimensions. The perception system 172 may also provide an uncertainty for each of the object's characteristics including location, type, heading, orientation, speed, acceleration, change in acceleration, size, shape, etc.

In some instances, characteristics as well as the uncertainties may be input into a behavior modeling system 174. For instance, a polygon representative of an object as well as the uncertainty for the object's characteristics may be input into the behavior modeling system 174. The behavior modeling system 174 may include software modules which use various behavior models based on object type to output a predicted future behavior for a detected object given a polygon representative of an object as well as the uncertainty for the object's characteristics. The predicted future behavior of an object may include a predicted trajectory representing a plurality of future locations and characteristics of the object. Due to the uncertainties for the characteristics and uncertainties inherent in behavior predictions, the behavior prediction model may provide an uncertainty for the trajectory which increases over time. In other words, the uncertainty relating to the object's predicted location and traveling direction may increase over time.

In other instances, the characteristics may be put into one or more detection system software modules, such as a traffic light detection system software module configured to detect the states of known traffic signals, construction zone detection system software module configured to detect construction zones from sensor data generated by the one or more sensors of the autonomous vehicle as well as an emergency vehicle detection system configured to detect emergency vehicles from sensor data generated by sensors of the autonomous vehicle. Each of these detection system software modules may uses various models to output a likelihood of a construction zone or an object being an emergency vehicle.

Detected objects, predicted future behaviors, various likelihoods from detection system software modules, the map information identifying the autonomous vehicle's environment, position information from the positioning system 170 identifying the location and orientation of the autonomous vehicle, a destination for the autonomous vehicle as well as feedback from various other systems of the autonomous vehicle may be input into a planning system software module of the planning system 168. The planning system may use this input to generate trajectories for the autonomous vehicle to follow for some brief period of time into the future based on a current route of the autonomous vehicle generated by a routing module of the routing system 166. A control system software module of the computing devices 110 may be configured to control movement of the autonomous vehicle, for instance by controlling braking, acceleration and steering of the autonomous vehicle, in order to follow a trajectory.

The computing devices 110 may control the autonomous vehicle in an autonomous driving mode by controlling various components. For instance, by way of example, the computing devices 110 may navigate the autonomous vehicle to a destination location completely autonomously using data from the detailed map information and planning system 168. The computing devices 110 may use the positioning system 170 to determine the autonomous vehicle's location and perception system 172 to detect and respond to objects when needed to reach the location safely. Again, in order to do so, computing device 110 may generate trajectories and cause the autonomous vehicle to follow these trajectories, for instance, by causing the autonomous vehicle to accelerate (e.g., by supplying fuel or other energy to the engine or power system 176 by acceleration system 162), decelerate (e.g., by decreasing the fuel supplied to the engine or power system 176, changing gears, and/or by applying brakes by deceleration system 160), change direction (e.g., by turning the front or rear wheels of vehicle 100 by steering system 164), and signal such changes (e.g., by lighting turn signals of the autonomous vehicle). Thus, the acceleration system 162 and deceleration system 160 may be a part of a drivetrain that includes various components between an engine of the autonomous vehicle and the wheels of the autonomous vehicle. Again, by controlling these systems, computing devices 110 may also control the drivetrain of the autonomous vehicle in order to maneuver the autonomous vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As noted above, typically, an autonomous vehicle's contour is often modeled by a rectangle (when viewed from the top-down) or a three-dimensional rectangle, which bounds all of the physical aspects of the autonomous vehicle including all of the autonomous vehicle's sensors and mirrors. The swept volume of the autonomous vehicle can be determined by approximating the path or trajectory as series of connected boxes each representing the location of the autonomous vehicle at a different time that are connected to one another. However, this approach may introduce false positive collisions, especially at the corners of the autonomous vehicle as the autonomous vehicle itself is not a perfect rectangle. At the same time, if a more complex polygon is used, such a representation may be computationally expensive when analyzing potential collisions with other objects on or in the autonomous vehicle's trajectory.

Figure 3:
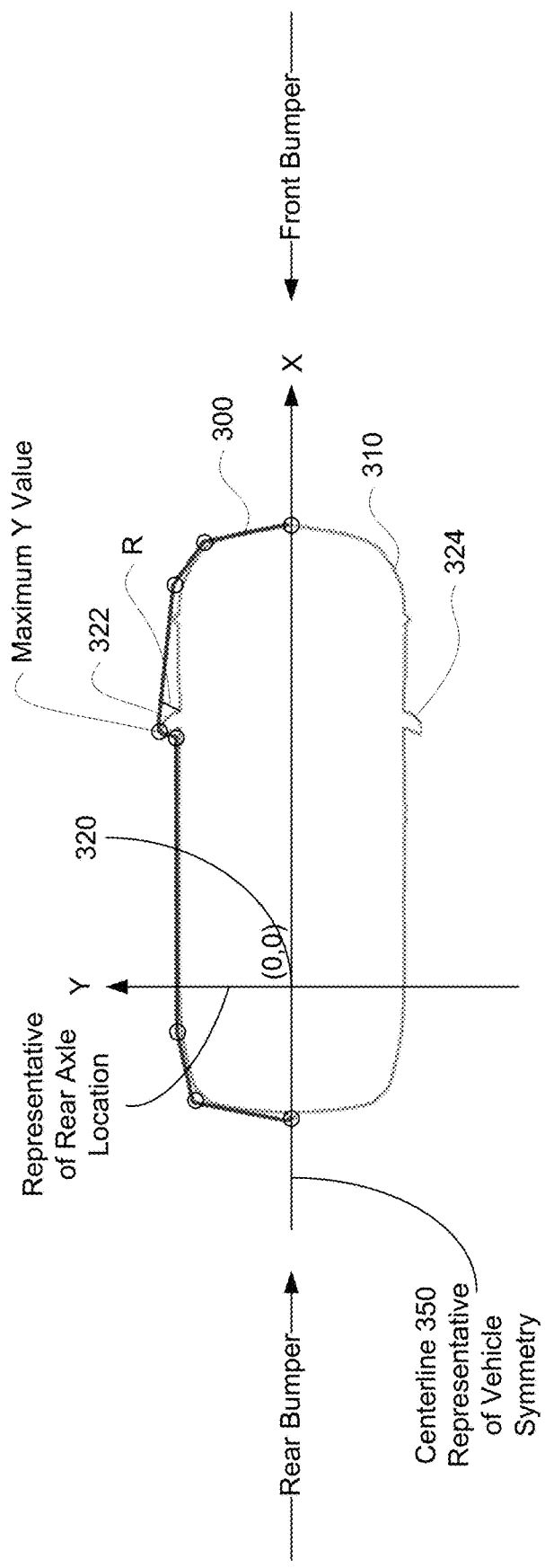
FIG. 3 is a polyline contour representation of a vehicle in accordance with aspects of the disclosure.

Rather than using a rectangle or a polygon, a polyline contour representation of the contours of a vehicle (or a polyline contour representation) may be determined based on a vehicle's width profile or width dimensions. The polyline contour representation can be defined for each side (left/right, driver/passenger, etc.) of the autonomous vehicle split by a center-line of the autonomous vehicle. Because most vehicles are left-right symmetric along the center-line, the polyline contour representation need only actually define one side of or half of the autonomous vehicle, for instance, the left or right side. In this regard, if the other half of the autonomous vehicle is needed for collision analysis, the polyline contour representation can simply be inverted. FIG. 3 is an example polyline contour representation 300 overlaid on an outline 310 of the autonomous vehicle 100. Moving this polyline contour representation or a polygon (e.g. a rectangle) representative of the autonomous vehicle along a trajectory generated by the planning system 168 may identify a swept volume for the autonomous vehicle 100 and may be used to identify which objects in the autonomous vehicle's environment are likely to intersect with this swept volume. The computing devices may then use the polyline contour representation to identify potential collision locations.

To simplify the calculations required for the collision analysis, the origin (0,0) location on the autonomous vehicle may be positioned at various locations for different purposes. For instance, when determining the autonomous vehicle width profile's coordinates use the autonomous vehicle's rear axle or some other location may be used as the origin and the autonomous vehicle's heading as the X axis. The Y axis may point to vehicle's left (e.g. driver's) side. For example, the origin 320 is located at the autonomous vehicle's rear axle at a point of symmetry on a centerline 350 along the length of the autonomous vehicle. When using the polyline contour representation for collision analysis, the origin may be positioned as needed to simplify the calculations as discussed further below.

An example polyline contour representation may be defined as a vehicle width profile drawn from the autonomous vehicle's front bumper to the autonomous vehicle's rear bumper. The polyline contour representation 300 has one, or at most two consecutive points that has the maximum y coordinate which is the autonomous vehicle's maximum half width or half of the maximum. In other words, the polyline contour representation may be generated using the minimum number of necessary points with the maximum y coordinate (i.e. two or less). In the typical case, the maximum y coordinate may correspond to half of the width of the autonomous vehicle measured at or the distance between the autonomous vehicle's mirrors 322, 324 (or lateral sensors) or rather, half of the greatest width dimension of the autonomous vehicle along the centerline 350 of the autonomous vehicle. The y coordinates on the polyline contour representation monotonically increases to the point with maximum y coordinate, then monotonically decreases such that the polyline contour representation has at most one peak (again, corresponding to the width of the autonomous vehicle's mirrors or lateral sensors). As depicted in FIG. 3, polyline has 8 points, each represented by a circle. Although the front or forward-most point and the rear-most point on the polyline are depicted with a y coordinate of 0 (i.e. they are located on the x-axis), the y coordinate of the front-most point and rear-most point could be larger than 0. The number of points selected for the polyline contour representation may be increased or decreased in order to increase or decrease accuracy of the collision analysis when using the polyline contour representation. For instance, in this example, the greatest distance between the outline 310 of the autonomous vehicle and the closes portion of the polyline contour representation 300, or the distance R1, is no more than 15 cm. Of course, the greater the number of points used, the greater the amount of processing power and resources required when performing the collision analysis.

In some instances, if the autonomous vehicle has a rectangular width profile, the polyline representation of the autonomous vehicle can have two consecutive points that have a maximum y coordinate. For example, if the autonomous vehicle is actually shaped like a rectangle, like a truck's trailer, the polyline contour representation may include points representing the two corners of the rectangle in the polyline representation. In other words, the polyline contour representation can be generalized to a rectangle.

Figure 4:
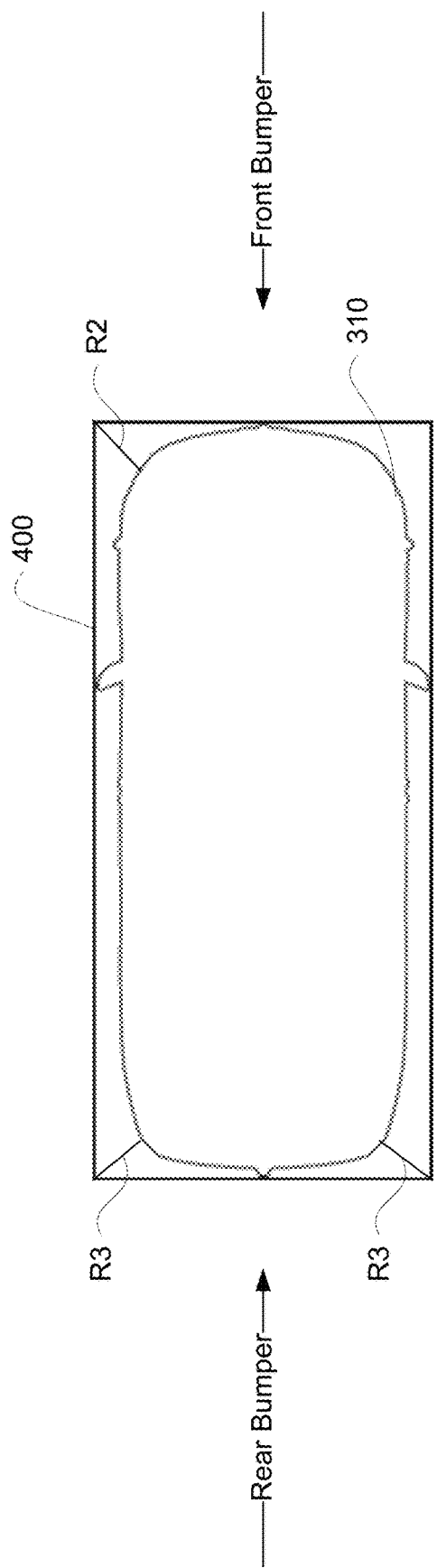
FIG. 4 is a polygon representation of a vehicle in accordance with aspects of the disclosure.

FIG. 4 is an example polygon 400 representative of vehicle 100 overlaid on the outline 310 of vehicle 100. In this example, the polygon 400 is a rectangle. The greatest distance between the outline 310 of the autonomous vehicle and the closest portion of the polygon 400 representative of the autonomous vehicle, or the distance R2, is as much as 43 cm at the front of the autonomous vehicle 100. The distance R3 at the rear of the autonomous vehicle may be as much as 36.8 cm. The maximum swept volume radius is of the polygon 400 representative of the autonomous vehicle is 6.961 m, as compared to that of the polyline contour representation is only 6.534 m. Thus, between the polyline contour representation 300 and the polygon 400 representative of the autonomous vehicle, there is a total swept volume lateral reduction of 42.7 cm. This difference may provide a rather large distinction between the swept volume of the polygon 400 representative of the object as compared to the polyline contour representation. Therefore, use of the polyline contour representation with respect to driving around object and collision avoidance may be significantly more accurate than a rectangular polygon representative of the autonomous vehicle.

Referring to the polyline contour representation, when the autonomous vehicle moves forward, objects can only collide with the half before the peak, and when the autonomous vehicle drives backward, objects can only collide with the half after the peak. As such, when performing a collision analysis, only the portion of the polyline contour representation before the peak is required when the autonomous vehicle is moving forward towards an object, and only the portion of the polyline contour representation after the peak is required when the autonomous vehicle is moving away from an object. In other words, when determining when the autonomous vehicle would collide with an object when the autonomous vehicle is driving forward, points on the polyline contour representation that are after the peak can be ignored, and when the autonomous vehicle is driving in reverse, points on the polyline contour representation that are before the polyline contour representation can be ignored.

Figure 5A:
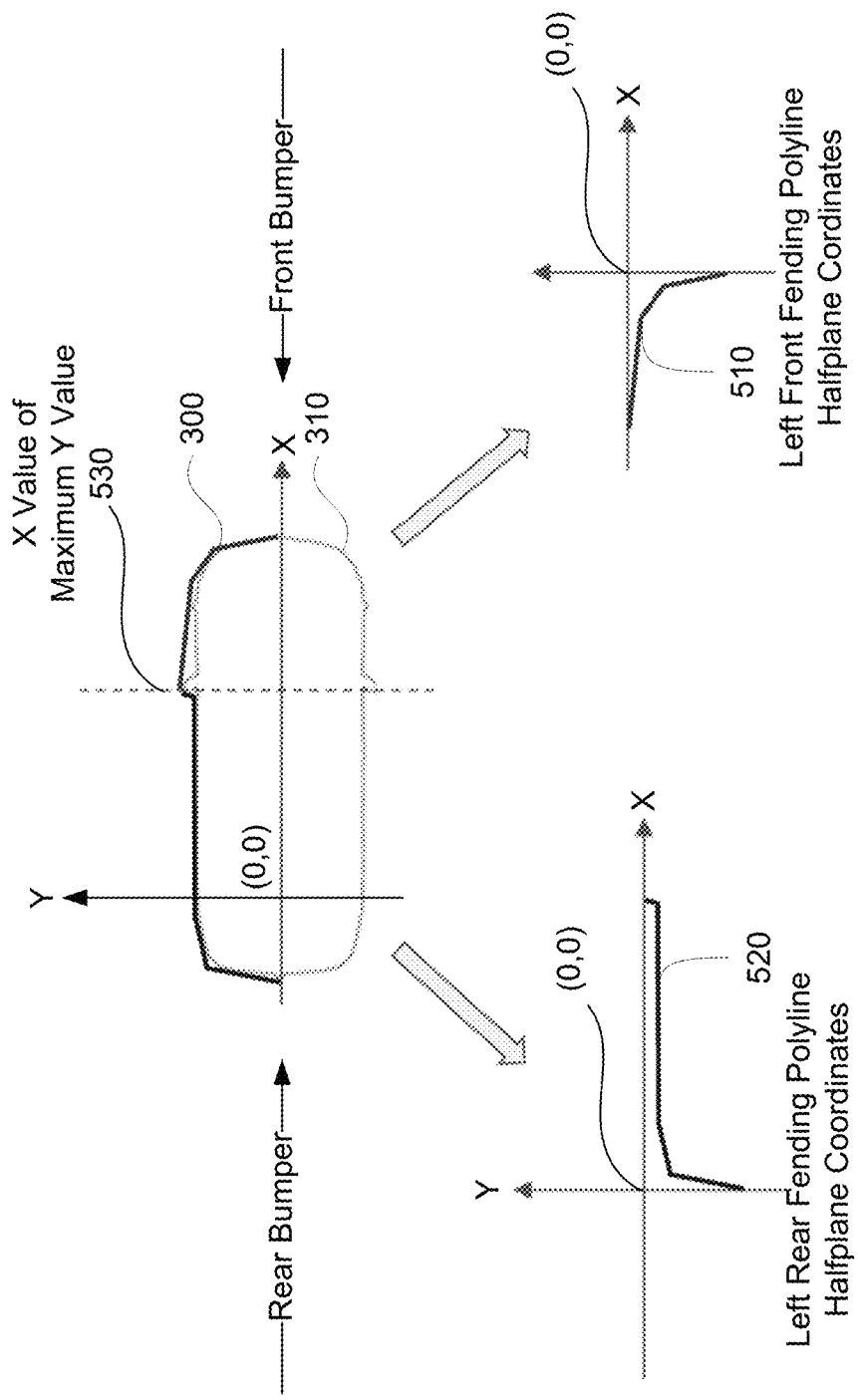
FIGS. 5A and 5B are example representations of conversion of a polyline contour representation of a vehicle to half-plane coordinates for front fending polyline contour representations and rear fending polyline contour representations in accordance with aspects of the disclosure.

In this regard, the polyline contour representation may be converted to half-plane coordinates for each of the portions of the polyline contour representation that are on the left side of the autonomous vehicle and in front of (i.e. closer to the front bumper of the autonomous vehicle) the peak or maximum y coordinate (hereinafter, the front fending polyline contour representation 510) or on the left side of the autonomous vehicle and behind or after (i.e. closer to the rear bumper of the autonomous vehicle) the peak or maximum y coordinate (hereinafter, the rear fending polyline contour representation 520). The half-plane is essentially "half" of a plane or a planar region consisting of all points on one side of an infinite straight line and none on the other. This line may correspond to, for instance, an axis of a coordinate system. FIG. 5A represents this conversion for left front and rear left fending polyline contour references. For instance, the autonomous vehicle 100 may be placed at the right side of a half-plane 530 which corresponds to the x coordinate of the maximum y coordinate of the polyline contour representation 300. After conversion, the y coordinate is width, which become negative in half-plane coordinate as the right side of half-plane is always negative by convention. In this regard, the height of the peak becomes y=0. When reasoning the overlaps between the autonomous vehicle 100 and an object, the left front and rear fending polyline contour representations 510, 520 may be "moved" forward and backward along the half-plane. Therefore, the x coordinates of the autonomous vehicle bumper polyline contour representations may be relative numbers. For the convenience of computing, in the right front fending polyline contour representation 510, the furthest or rightmost point on the autonomous vehicle's front bumper may be assigned to x=0.0, and in the rear fending polyline contour representation 520, the furthest or the leftmost point on the rear bumper may be assigned to x=0.0. All of the rest of the x coordinates on the half-plane for the left front fending polyline contour representation 510 are negative numbers relative to the rightmost point. All of the rest of the x coordinates on the half-plane for the left rear fending polyline contour representation 520 are positive numbers relative to the leftmost point.

Figure 5B:
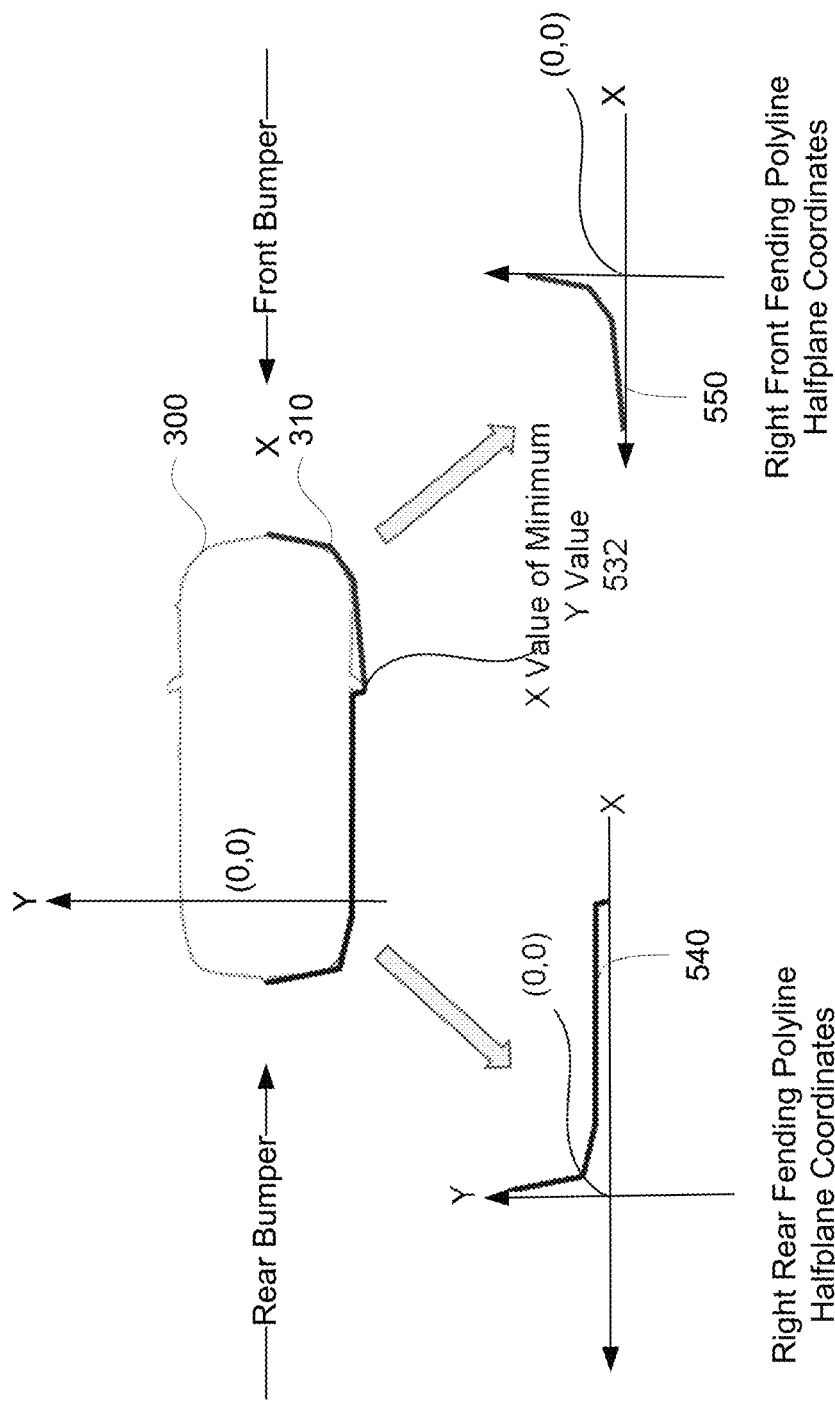

Similarly, an inverted version of the polyline contour representation may be determined in half-plane coordinates for each of the portions of the polyline contour representation that are both on the right side of the autonomous vehicle or before a minimum y coordinate (hereinafter, the right front fending polyline contour representation 510) as well as after the minimum (hereinafter, the right rear fending polyline contour representation 520). FIG. 5B represents this conversion for right front and rear left fending polyline contour references. For instance, the autonomous vehicle 100 may be placed at the right side of a half-plane 532 which corresponds to the X-coordinate of the minimum coordinate of the polyline contour representation 300. After conversion, the y coordinate is width, which become positive in half-plane coordinate as the right side of half-plane is always negative by convention. In this regard, the height of the minimum becomes y=0. When reasoning the overlaps between the autonomous vehicle 100 and an object, the left front and rear fending polyline contour representations 550, 540 may be "moved" forward and backward along the half-plane. Therefore, the x coordinates of the autonomous vehicle bumper polyline contour representations may be relative numbers. For the convenience of computing, in the right front fending polyline contour representation 510, the furthest or rightmost point on the autonomous vehicle's front bumper may be assigned to x=0.0, and in the right rear fending polyline contour representation 540, the furthest or the leftmost point on the rear bumper may be assigned to x=0.0. All of the rest of the x coordinates on the half-plane for the right front fending polyline contour representation 510 are negative numbers relative to the rightmost point. All of the rest of the x coordinates on the half-plane for the right rear fending polyline contour representation 520 are positive numbers relative to the leftmost point.

Figure 17:
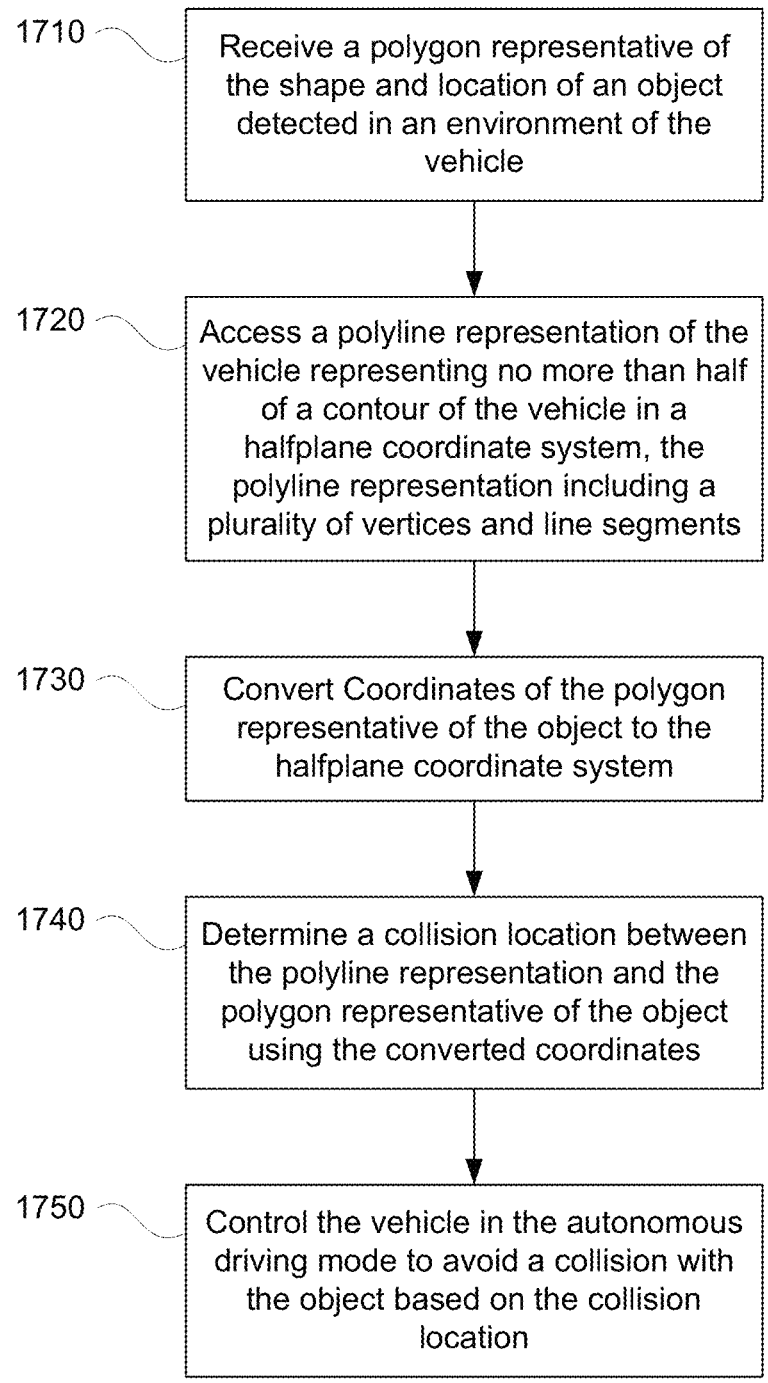
FIG. 17 is an example flow diagram in accordance with aspects of the disclosure.

FIG. 17 is an example flow diagram 1700 in accordance with aspects of the disclosure which may be performed by one or more processors of one or more computing devices, such as processors 120 of computing devices 110, in order to maneuver a vehicle having an autonomous driving mode. For instance, at block 1710, a polygon representative of the shape and location of an object detected in an environment of the autonomous vehicle is received. For example, as the autonomous vehicle 100 drives around, the perception system 172 may detect and identify the shape and location of objects in the autonomous vehicle's environment. For instance, the perception system may provide location information as well as a polygon representative of the shape and location of each detected object. The polygon representative of the object may be in any coordinate system, for instance, latitude and longitude or a coordinate system of the autonomous vehicle 100 or a sensor of the perception system 172.

At block 1720, a polyline contour representation of the autonomous vehicle representing no more than half of a contour of the autonomous vehicle in a half-plane coordinate system is accessed. The polyline contour representation may be accessed, retrieved, received or otherwise identified. For instance, the fending polyline contour representations 510, 520, 540, 550 may be pre-stored in the memory 130, for example, after having been received from a remote computing device over a network and/or directly downloaded to the computing devices 110. In this regard, the polyline contour representations can be accessed or retrieved from the memory as needed. As discussed above, the polyline contour representation, or each of the fending polyline contour representations 510, 520, 540, 550, includes a plurality of vertices and line segments.

Figures 6, 7:
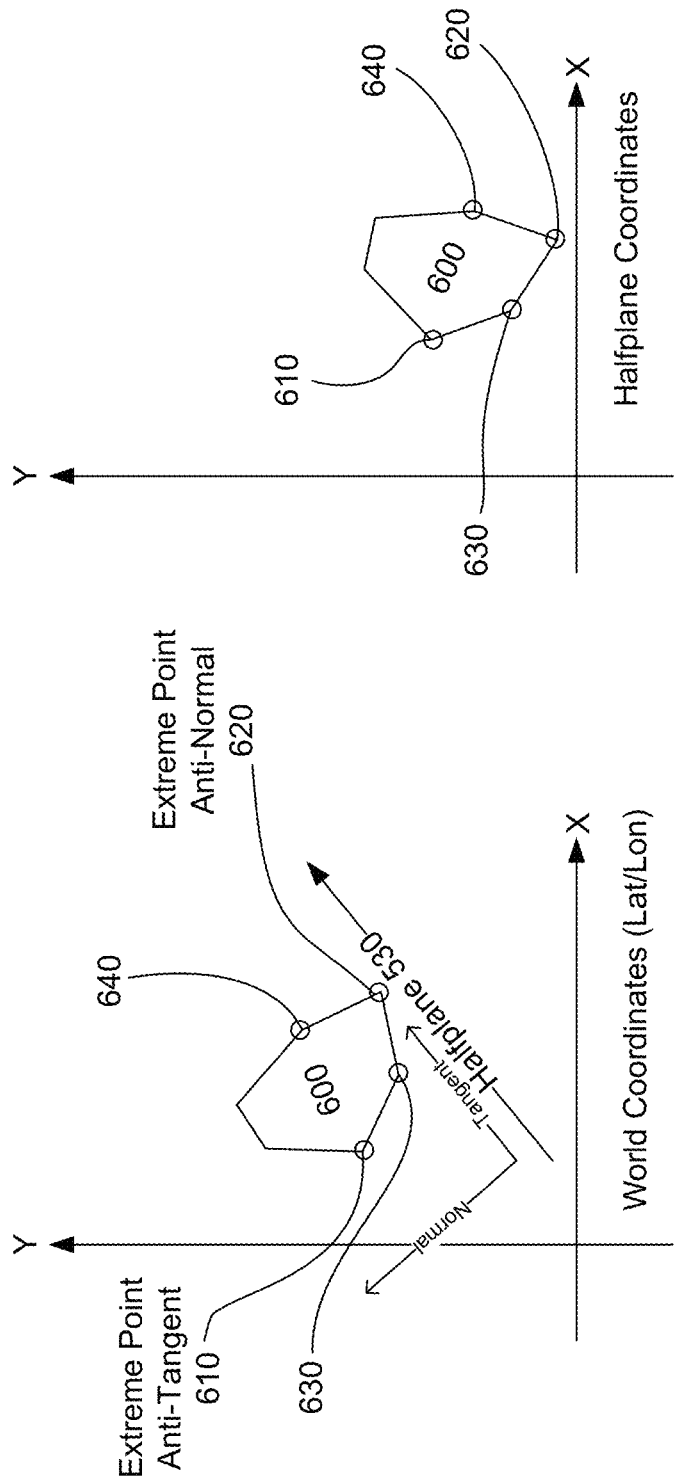
FIG. 6 is an example polygon representative of an object in world coordinates in accordance with aspects of the disclosure.
FIG. 7 is an example polygon representative of an object in half-plane coordinates in accordance with aspects of the disclosure.

At block 1730, coordinates of the polygon representative of the object are converted to the half-plane coordinate system. For instance, when performing the collision analysis, the polygon representative of the object may be converted to the half-plane coordinate system using the location information. This may be done, for example, by finding the polygon's extreme points in half-plane's forward direction and perpendicular direction. For instance, FIG. 6 provides a view of a polygon 600 representative of an object detected by the sensors of the perception system 172. In this example, the half-plane 530 is depicted with respect to a real-world coordinate system (e.g. latitude and longitude). The normal and tangent directions (represented by arrow) with respect to the half-plane 530 are also depicted. The extreme points 610, 620 represent the most anti-tangent point and the most anti-normal point of the polygon 600 with respect to the half-plane 530.

Figure 8:
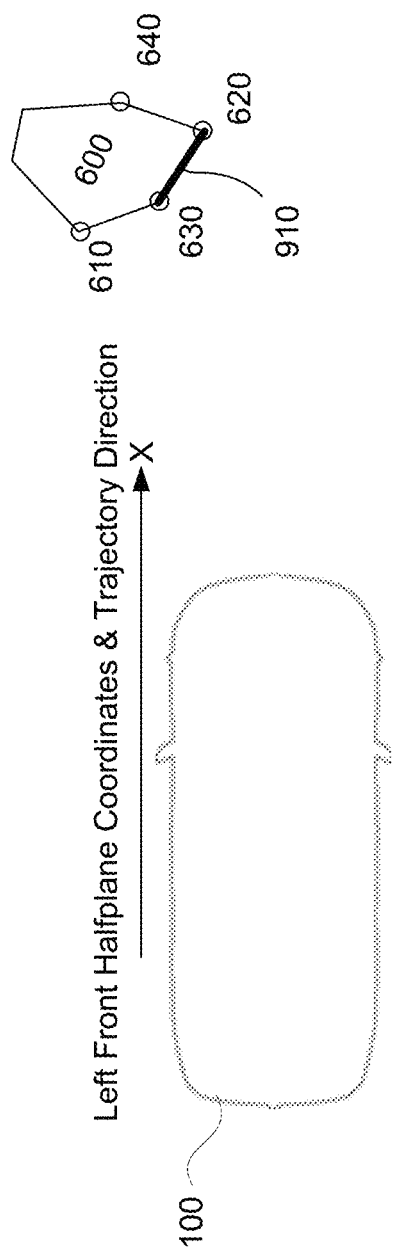
FIG. 8 is an example representation of a vehicle and a polygon representative of an object in half-plane coordinates in accordance with aspects of the disclosure.

Then, all or a portion of the polygon 600, may be determined or extracted from the polygon representative of the object. For example, for a convex polygon, the extreme points of the polygon at a given direction can be determined using O(log(n)) time complexity, where n is the number of vertices of the polygon. In the example, the points 610, 620, 630 and 640 need to be converted when checking for collisions when the autonomous vehicle drives along the half-plane direction (i.e. following its trajectory) as these y coordinates of these points with respect to the half-plane are less than or equal to the maximum y-coordinate value of the polyline. In other words, it would not be possible for points between 640 and 610 (in the counterclockwise direction) in FIG. 6 to have a collision with the autonomous vehicle (or rather, the polyline 600) earlier than point 610 (which is the rear-most point in the half-plane direction). This would also be true when the all of the y coordinates of the polygon (when in half-plane coordinates) are less than the maximum y-coordinate. The polygon points of that portion may be converted to half-plane coordinates. For example, as shown in FIGS. 7 and 8 (FIG. 8 depicting the relative location of the autonomous vehicle 100), the polygon 600 has been converted to half-plane coordinates. In this example, point 610 represents an extreme X coordinate, and point 620 represents an extreme (very low) y coordinate. Any coordinate conversion algorithm such as those that involve rotating and translating the points may be used.

Returning to FIG. 17, at block 1740, a collision location between the polyline contour representation and the polygon representative of the object using the converted coordinates. This may involve mathematically "sliding" or "moving" the polyline contour representation in 1 dimension (along the half-plane direction) in order to define a swept volume for the autonomous vehicle and determine where the polyline contour representation would intersect with the representation of the object. In practice, this may involve subtracting the position or x coordinates between two points (one on the polyline contour representation and one on the polygon) in order to determine how far the polyline contour representation (and/or the representation of the object) has to move (or slide along the half-plane) to have collision. The collision location may include an entry location which corresponds to a point on or a particular line segment of the polyline contour representation of the object which would collide with the autonomous vehicle given the autonomous vehicle's current or a future trajectory (for instance, generated by the planning system 168).

Figure 9:
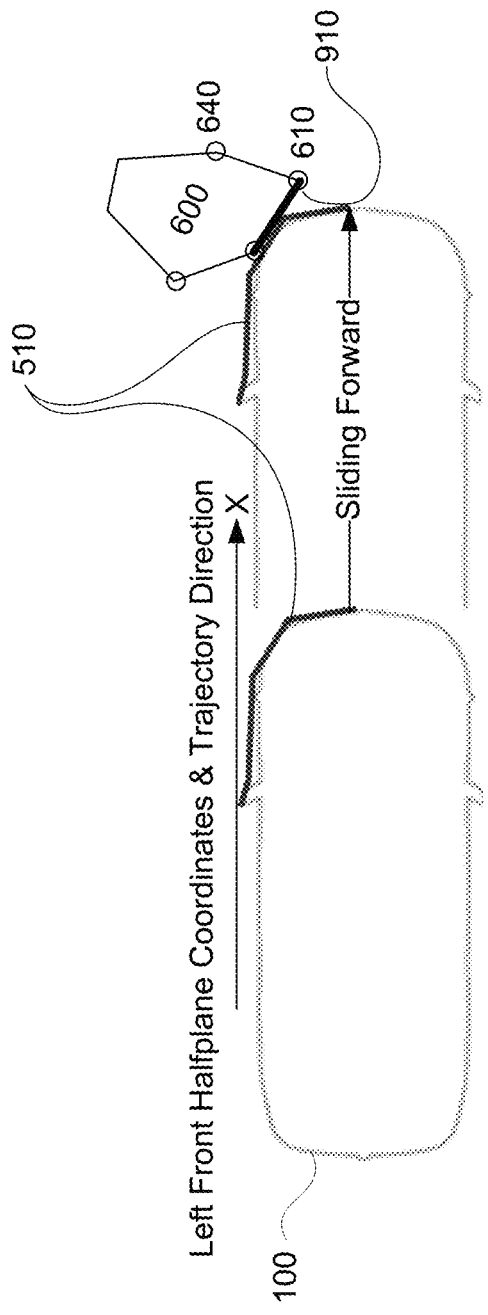
FIG. 9 is an example representation of moving a left front fending polyline contour representation towards a polygon representative of an object in half-plane coordinates in accordance with aspects of the disclosure.

For instance, turning to FIG. 9, the polyline contour representation may be slid or moved (forward or backwards) along the planned trajectory of the autonomous vehicle towards the object (or rather, the x-coordinates may be subtracted from one another). In the example of FIG. 9, the front fending polyline contour representation 510 is used and is moved in the direction of the autonomous vehicle 100's planned trajectory. If the autonomous vehicle were moving in reverse, the rear fending polyline contour representation would be used to determine the entry location. The entry location for each segment (such as a pair of vertices and the line segment between them) of the polygon representative of the object may be determined. Here the line segment 910 between points 620 and 630 may be identified as the entry location.

Figure 10:
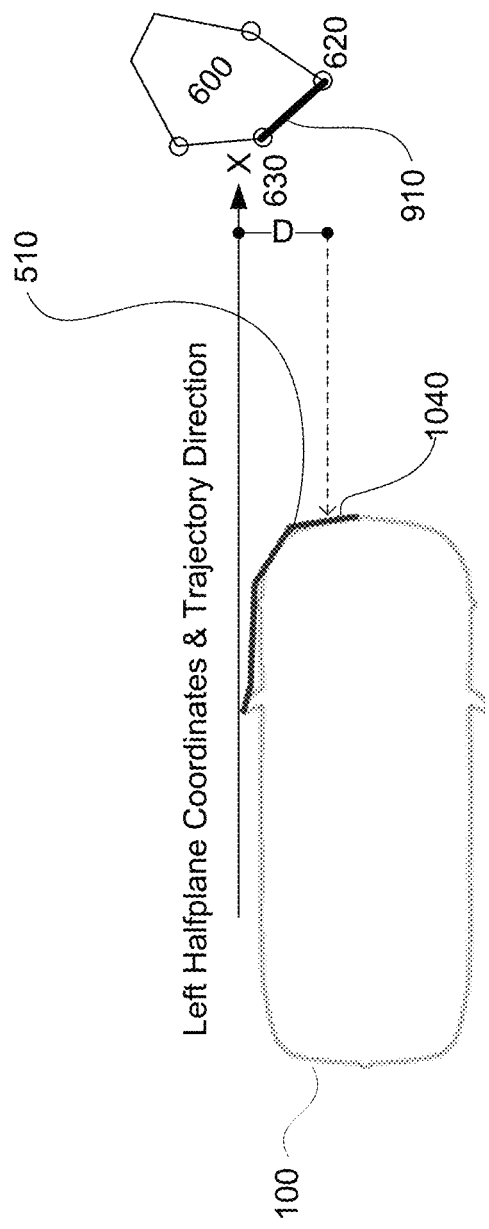
FIG. 10 is an example representation of a left front fending polyline contour representation and a polygon representative of an object in half-plane coordinates in accordance with aspects of the disclosure.
Figure 11:
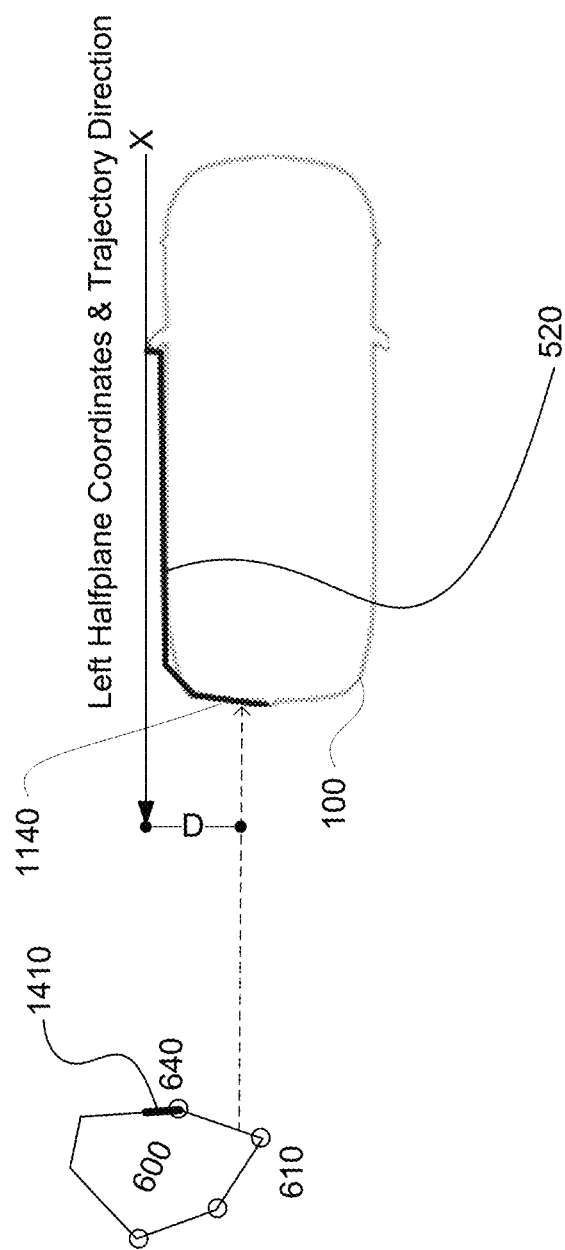
FIG. 11 is an example representation of a left rear fending polyline contour representation and a polygon representative of an object in half-plane coordinates in accordance with aspects of the disclosure.

For instance, for each line segment, the deepest penetration point of that line segment into the half-plane coordinate system (D) may be determined. Turning to FIG. 10, and referring only to the line segment 910 for simplicity, this distance D between the deepest portion of the line segment 910 and the front fending polyline contour representation 510 may be determined. Similarly, turning to FIG. 11, and referring only to the line segment 910 for simplicity, this distance D between the deepest portion of the line segment 910 and the front fending polyline contour representation 510 may be determined. This process may be repeated for other line segments of the portion of the representation of the object.

Figure 12:
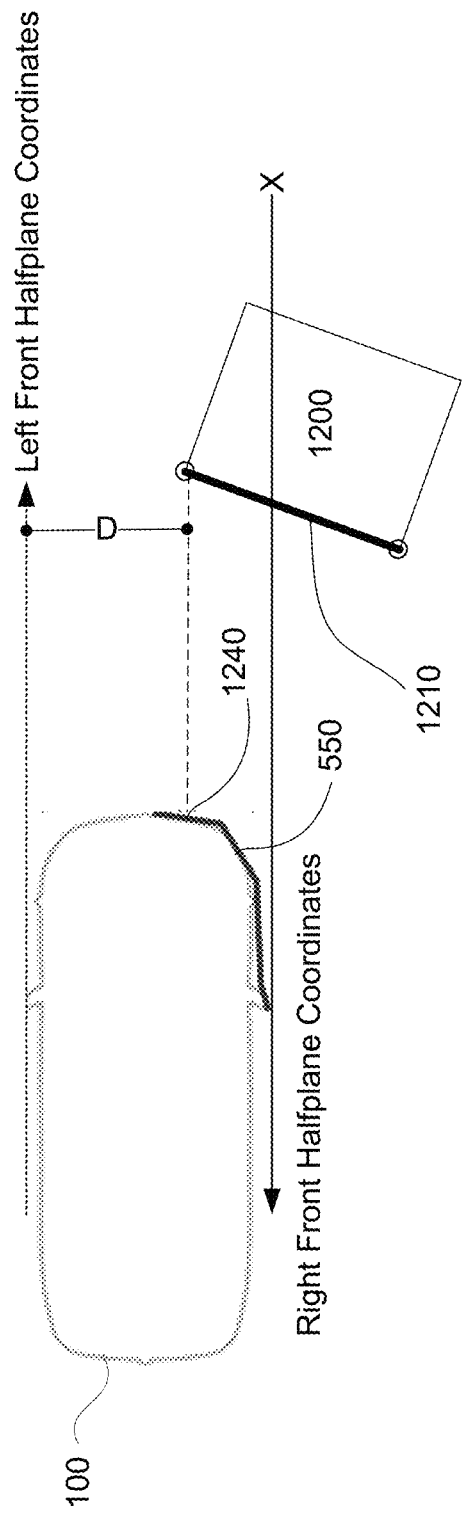
FIG. 12 is an example representation of a right front fending polyline contour representation and a polygon representative of an object in half-plane coordinates in accordance with aspects of the disclosure.

If the depth of the extreme point of the polygon in the half-plane's anti-tangent direction goes below the lowest y-coordinate of the front fending polyline contour representation 510, the right front fending polyline contour representation may be used. For example, FIG. 12 represents the distance from the deepest penetration point of a line segment 1210 of a polygon 1200 representative of an object. In this example, an inverted version 1220 of the right front fending polyline contour representation 550 is used.

Figure 13:
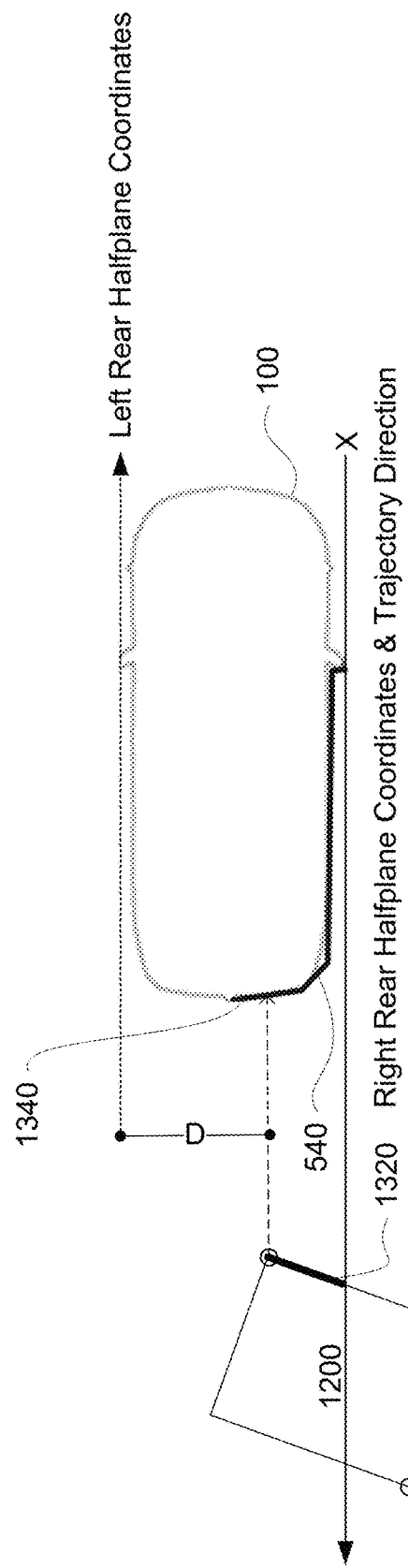
FIG. 13 is an example representation of a right rear fending polyline contour representation and a polygon representative of an object in half-plane coordinates in accordance with aspects of the disclosure.

Similarly, if the depth of the extreme point of the polygon in the half-plane's tangent direction goes below the lowest y-coordinate of the rear fending polyline contour representation 520, the left rear fending polyline contour representation (or rather, a right side) may be used. FIG. 13 represents the distance from the deepest penetration point of a line segment 1320 (that is within the right rear halfplane coordinate system) of a polygon 1200 representative of an object. In this example, the right rear fending polyline contour representation 540 is used.

The polyline contour representation line segment on each of the front fending and rear fending polyline contour representations (or inverted polyline contour representations) that has the same penetration depth as D may be identified. In each of the examples of FIGS. 10, 11, 12, and 13 the dashed-line arrows point to the respective line segments 1040, 1140, 1240, 1340 of the corresponding polyline contour representations. Finding the distances D may enable the computing devices to determine which part of the polygon is relevant to determining the entry location. For each vertex point on the line segment, that vertex point may be projected onto the autonomous vehicle polyline contour representation at the same depth in order to determine the entry location. For example, returning to the example of line segment 910 of FIG. 9, the points 620 and 630 may be projected onto the autonomous vehicle polyline contour representation at the corresponding depths in order to determine the entry location. Alternatively, for each vertex point on vehicle polyline contour representation, that vertex point may be projected onto to the corresponding polygon segments and to determine the entry location. These projections can be done easily in half-plane coordinate as the depth may be just the respective vertex point's y coordinate, or rather, the y coordinates of points 620 and 630. After the projection, the right-most position (that the polyline contour representation can slide to collide with the polygon) or rather the entry location may be identified. For example, this process may start by analyzing the polyline and the polygon's vertices from the lowest depth (lowest y coordinate) towards the highest depth (highest y coordinates) to check for collisions, for instance, by subtracting x coordinates of points having the same y coordinates. As such, the computing devices 110 need only check the polyline and polygon segments that have overlapping ranges of y coordinates.

In addition to determining the entry location for the collision location, the exit location for the collision location may also be determined in a similar manner. This may be done using the rear fending polyline contour representation when the autonomous vehicle is moving forward and the front fending polyline contour representation when the autonomous vehicle is moving in reverse. This may involve identifying the most extreme points of the polygon in the tangent direction of the left side halfplane coordinate system, or in the anti-tangent direction of the right side half-plane coordinate system. (depending upon whether the vehicle is moving forward or backwards) and determining when the polyline would move beyond this extreme most point in order to determine the exit location.

Figure 14:
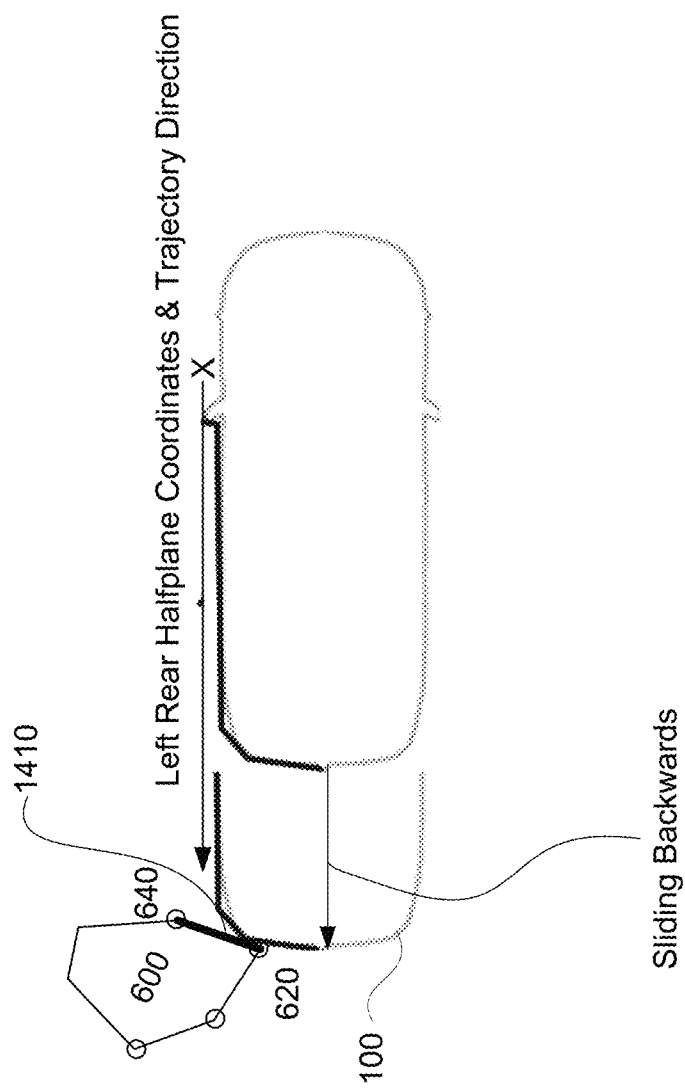
FIG. 14 is an example representation of moving a left front fending polyline contour representation towards a polygon representative of an object in half-plane coordinates in accordance with aspects of the disclosure.

For instance, turning to FIG. 14 (and using the same example from FIG. 9), the portion of the polygon 600 representative of the object is placed at the same position relative to depth of the half-plane coordinates, but behind the autonomous vehicle 100, rather than in front of the autonomous vehicle. In this regard, rather than "sliding" or "moving" the rear fending polyline contour representation in the direction of the trajectory of the autonomous vehicle 100, the rear fending polyline contour representation is moved towards the polygon 600 representation of the object (or the relevant portion and/or line segment) in order to determine the exit location given the extreme most point (here point 640) for the polygon 600 in the tangent direction of the left side halfplane coordinate system, for instance for the line segment 1410 between points 620 and 640 as described above. In practice, this may also involve subtracting the position or x coordinates between two points (one on the polyline contour representation and one on the polygon) in order to determine how far the rear fending polyline contour representation (and/or the representation of the object) has to move (or slide along the half-plane) to have collision. As with the example above, depending upon the distance D of the rear-most point or front most-point, the inverted version (or right side) of the rear fending polyline contour representation may be used.

Figure 16A:
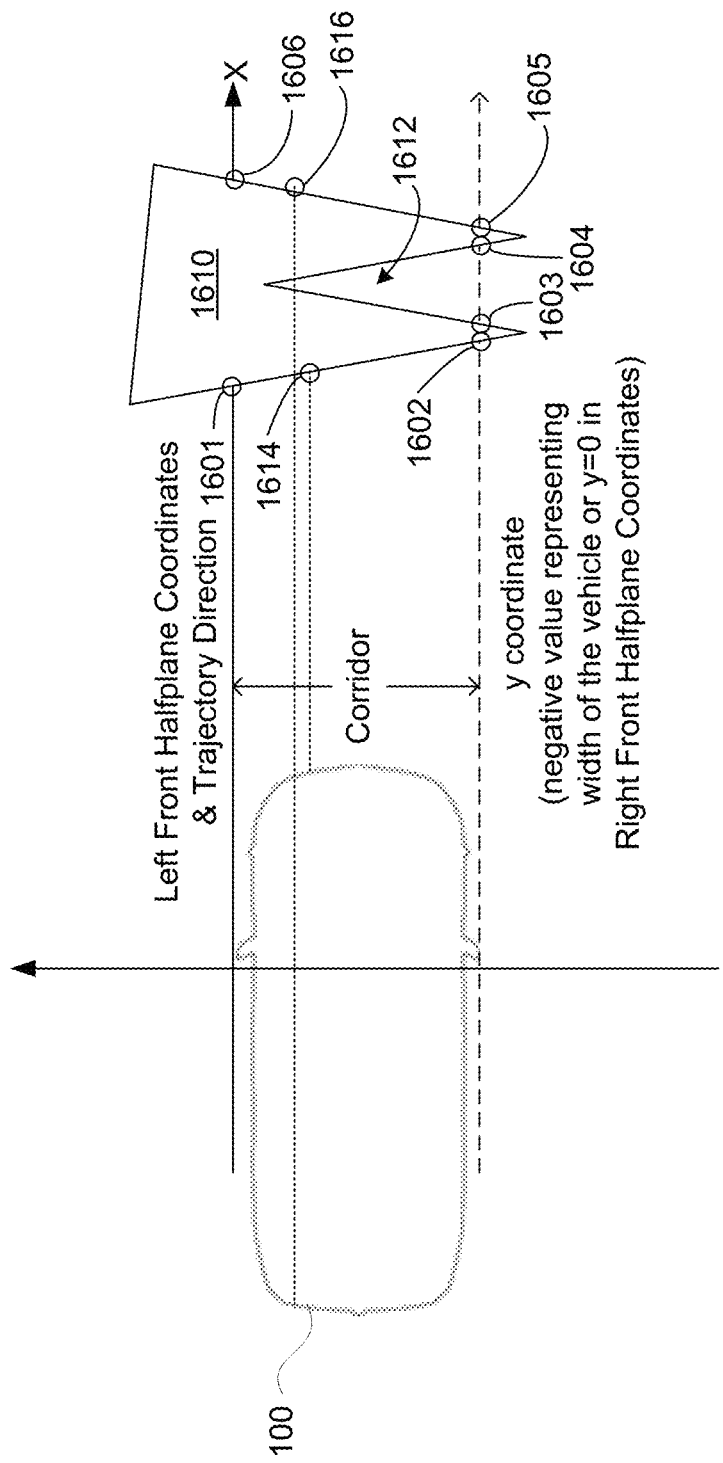
FIGS. 16A and 16B are an example representations of polyline contour representations and polygons representative of an object in accordance with aspects of the disclosure.
Figure 16B:
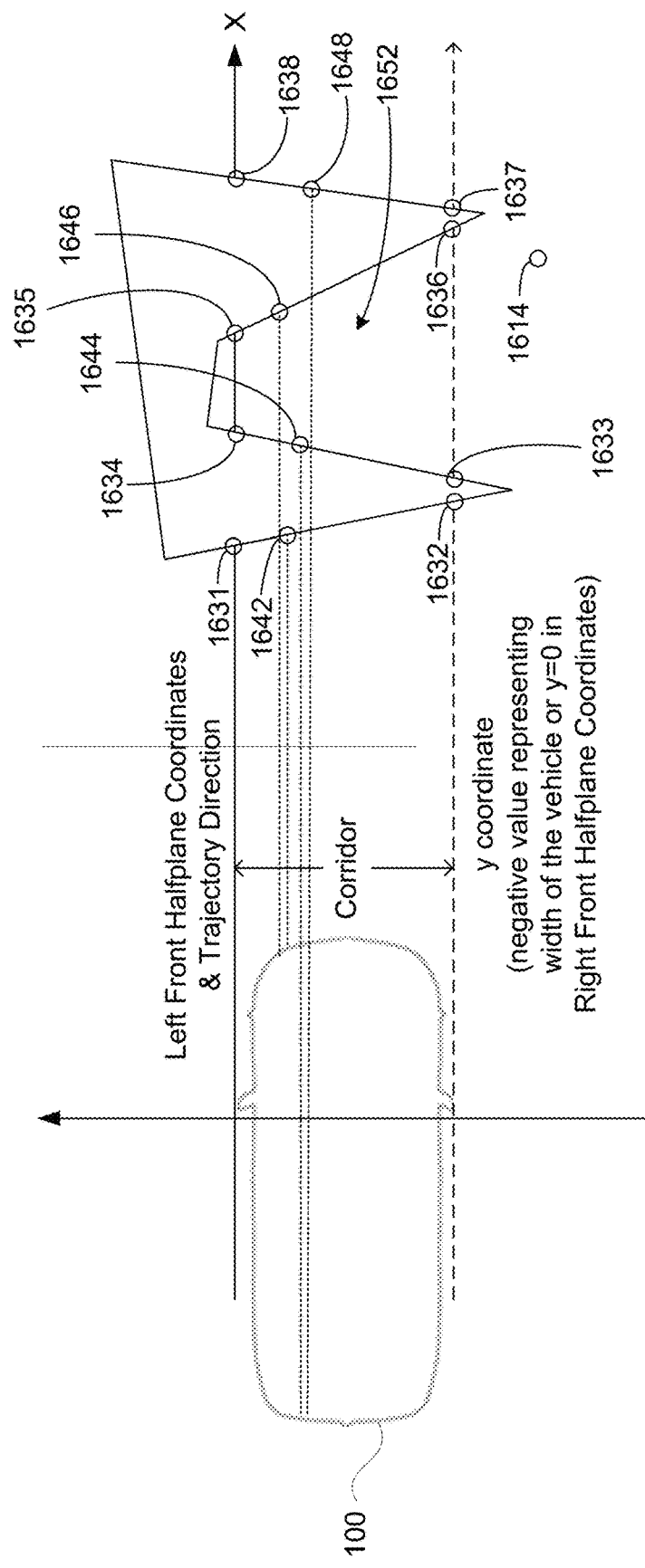

In the case of more complex polygons representative of more complex objects, such as concave polygons where there may be multiple collision locations (i.e. multiple entry and exit location pairs), in order to determine the actual entry location and exit locations, both the polyline contour representations for the left and right side of the autonomous vehicle or both half-planes may be used. In other words, a "corridor" bounded by the left front fending polyline representation half-plane and the corresponding y coordinate for the right front fending polyline representation's half-plane may be used. FIGS. 16A and 16B represent vehicle 100 approaching an object represented by concave polygons 1620 and 1640, respectively. The computing devices 110 may then identify all of the intersection points between the convex polygon and the boundaries of the corridor. For instance, in FIG. 16A, points 1601-1606 are identified, and in FIG. 16B, points 1631-1638 are identified. The computing devices may then analyze the intersection points to determine any independent overlaps. If there are two neighboring or adjacent intersection points where the edges of the object polygon would enter and then exit the corridor (e.g. representing a potential collision location and a potential exit location) directly adjacent to one another on the same side of the corridor, these points may be ignored. For instance, in FIG. 16A, intersection points 1603 and 1604 would be ignored, and in FIG. 16B none of the intersection points would be ignored.

Of the remaining points, the computing devices may identify the entry locations as well as the exit locations in order to determine a collision location and an exit location for an overlap with the object. For the entry points where the autonomous vehicle would enter the polygon, the computing devices may identify the entry point with the smallest x coordinate value. For the exit locations where the autonomous vehicle would exit the polygon, the computing devices may identify the exit location with the largest x coordinate value.

In the example of FIG. 16A, the entry location 1614 is on the line segment between intersection points 1601 and 1602, and the entry location's x coordinate is where the left or right front fending polyline (here left) has the smallest distance in the x direction from the line segments between points 1601 and 1602. Similarly, the exit location 1612 is on the line segment between intersection points 1605 and 1606, and the exit location's x coordinate is where the left or right rear fending polyline (here right) has the largest distance in the x direction with the line segments between 1605 and 1606.

In the example of FIG. 16B, there are two overlaps with the polygon 1640. The entry location 1642 for the first overlap is on the line segment between intersection points 1631 and 1632, and the entry location's x coordinate is where the left or right front fending polyline has the smallest distance in the x direction from the line segments between points 1631 and 1632. Similarly, the exit location 1644 for the first overlap is on the line segment between intersection points 1633 and 1634, and the exit location's x coordinate is where the left or right rear fending polyline has the largest distance in the x direction with the line segments between 1633 and 1634. The entry location 1646 for the second overlap is between intersection points 1635 and 1636, and the entry location's x coordinate is where the left or right front fending polyline has the smallest distance in the x direction from the line segments between points 1635 and 1636. Similarly, the exit location 1648 for the first overlap is between intersection points 1637 and 1638, and the exit location's x coordinate is where the left or right rear fending polyline has the largest distance in the x direction with the line segments between 1637 and 1638. In these examples, there is no possibility that the autonomous vehicle can safely be in the space 1612 of FIG. 16A, but there may be a chance that the autonomous vehicle can safely be in the space 1652 of FIG. 16B if the distance in the x-direction between intersection point 1634 and intersection 1635 is at least as long as the length of the autonomous vehicle 100.

Figure 15:
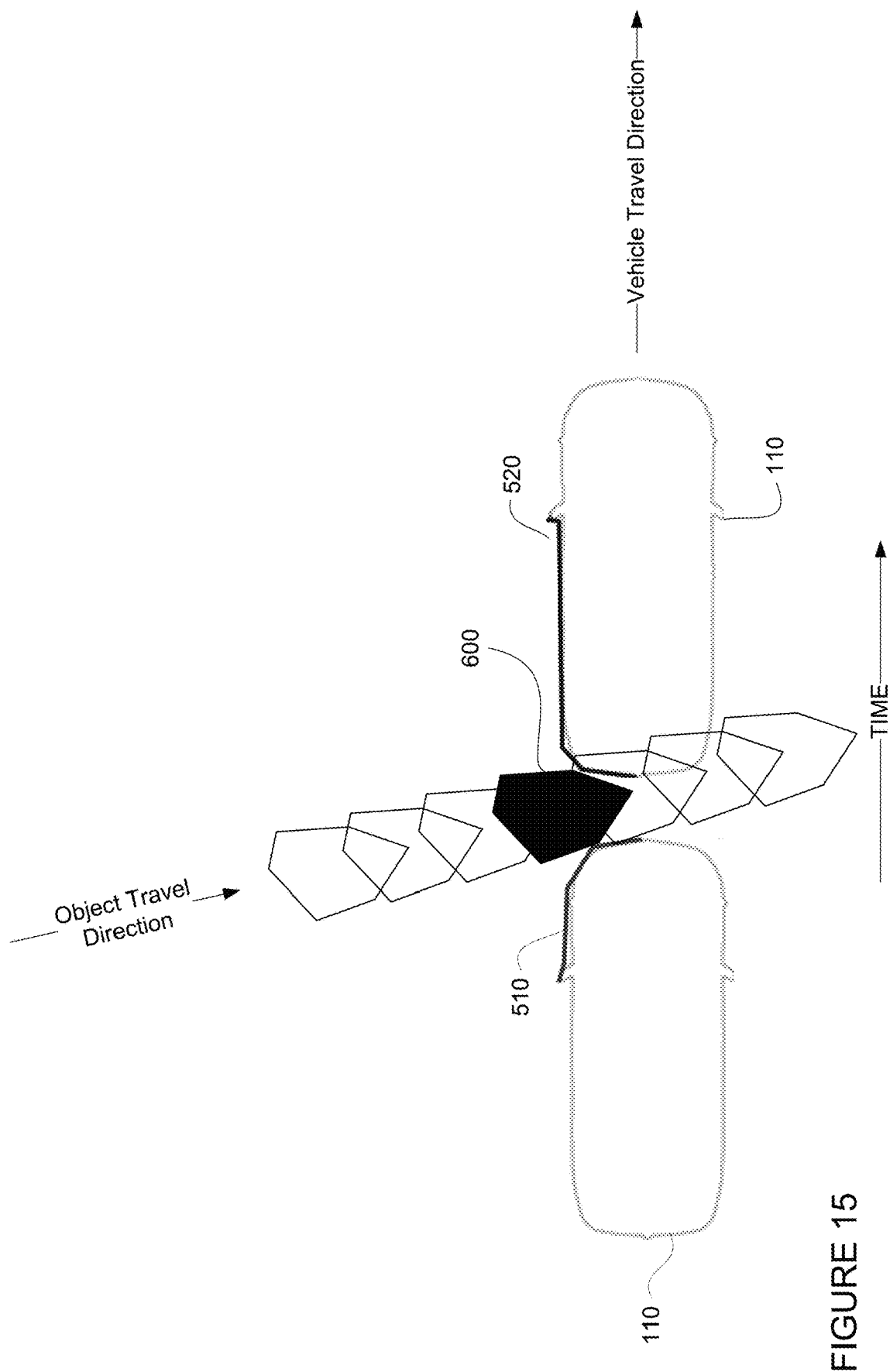
FIG. 15 is an example representation of left front and rear fending polyline contour representations and a polygon representative of an object at different points in time in accordance with aspects of the disclosure.

At block 1750, the autonomous vehicle is controlled in the autonomous driving mode to avoid a collision with the object based on the collision location. For instance, once the entry location and collision exit location are determined, the autonomous vehicle's computing devices can use this information to determine how to better control the speed of the autonomous vehicle (e.g. drive faster or slower) in an autonomous driving mode in order to avoid the object. While the entry location may identify where the autonomous vehicle will have collision with an object, the exit location may identify how the autonomous vehicle can get out of the collision. This may be useful when a vehicle's computing devices decide to overtake (proceed in front of rather than yielding to) an object's path. For example, referring to FIG. 15 which depicts the polygon 600 at different points in time. This depiction of the polygon 600 at different points in time actually represents a path of the object over time. FIG. 15 also indicates the object's travel direction as well as the travel direction of vehicle 100. As time progresses (per the arrow to the right), the object is expected to move towards the bottom right of the image and across a trajectory of the autonomous vehicle (or rather the autonomous vehicle's travel direction). Assuming the autonomous vehicle 100 could have collision with the object initially at the location of the shaded version of the polygon 600, the autonomous vehicle 100 can slow down and yield to the object of rather to the object's path before the entry location. Alternatively, the autonomous vehicle 100 can drive faster and further than out than the exit location of the polygon 600 before the object arrives at the location of the shaded version of the polygon. Therefore, the exit location is equally important as the entry location.

Figure 25:
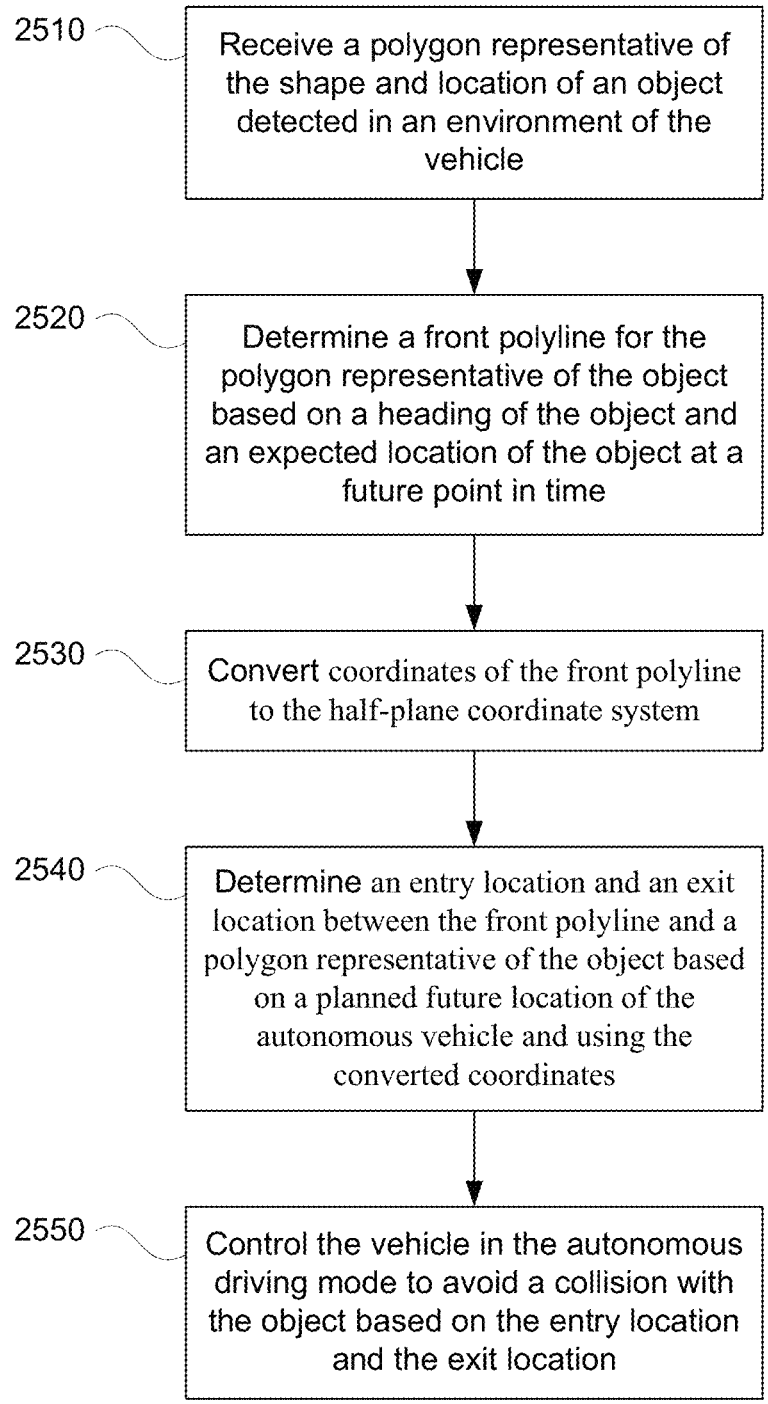
FIG. 25 is an example flow diagram in accordance with aspects of the disclosure.

As in the examples above, an object's contour is often modeled by a 2D or 3D polygon, which bounds all of the points for an object detected by an autonomous vehicle's perception system. FIG. 25 is an example flow diagram 2500 in accordance with aspects of the disclosure which may be performed by one or more processors of one or more computing devices, such as processors 120 of computing devices 110, in order to maneuver a vehicle having an autonomous driving mode. For instance, at block 2510, a polygon representative of the shape and location of an object detected in an environment of the autonomous vehicle is received. For example, as the autonomous vehicle 100 drives around, the perception system 172 may detect and identify the shape and location of objects in the autonomous vehicle's environment. For instance, the perception system may provide location information as well as a polygon representative of the shape and location of each detected object. The polygon representative of the object may be in any coordinate system, for instance, latitude and longitude or a coordinate system of the autonomous vehicle 100 or a sensor of the perception system 172.

A predicted trajectory for the object may also be determined by the behavior modeling system 174, for instance using various behavior modeling techniques as well as sensor data from the perception system 172 for the object, other objects, as well as the autonomous vehicle's environment generally. A 2D or 3D path for the object may be determined by moving the polygon representative of the object along the predicted trajectory. Modeling for collisions is typically done by determining a 2D or 3D path for the autonomous vehicle using the autonomous vehicle's future trajectory and determining whether it will intersect with the 2D or 3D path for the object.

However, due to uncertainty in the characteristics (size, shape, location, speed, acceleration, etc.) of the polygon representative of the object from the perception system as well as the behavior modeling system 174, there may be significant lateral uncertainty relative to the object's traveling direction. As such, the 2D or 3D path for the object can be fairly inaccurate, resulting in possibly inaccurate collision determinations when comparing to the 2D or 3D path of the autonomous vehicle.

Figure 18:
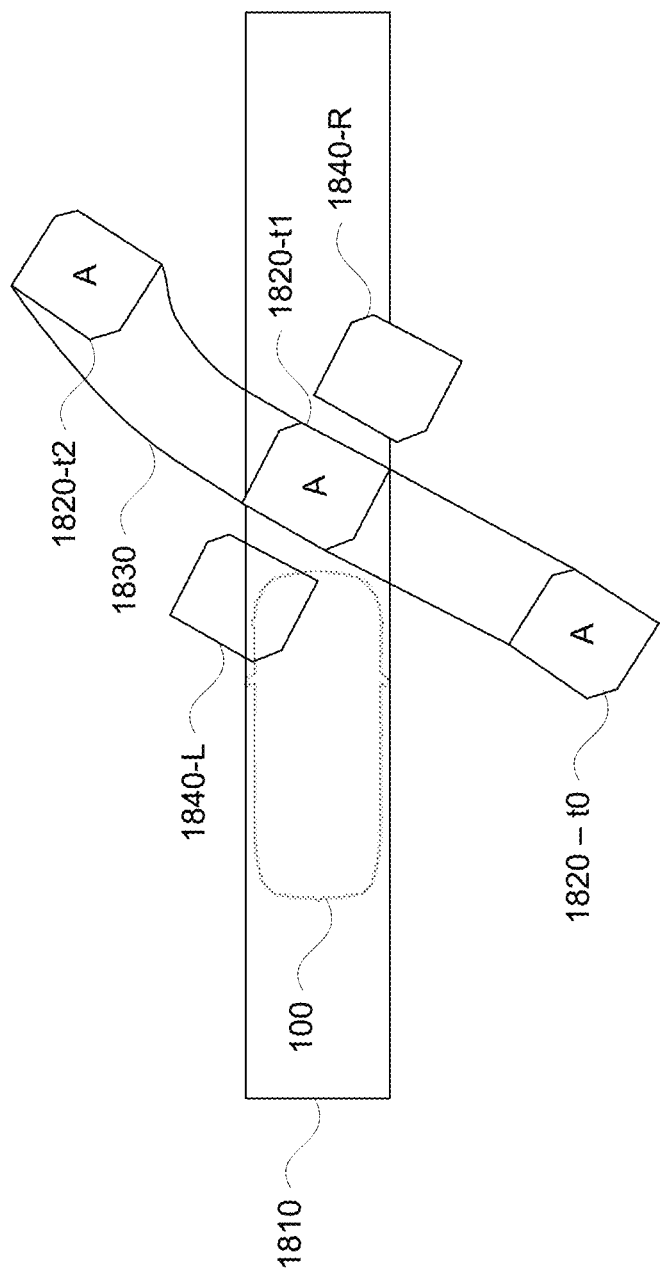
FIG. 18 is an example of lateral uncertainty for a polygon representative of an object with respect to a polygon representative of a vehicle and a planned trajectory for the autonomous vehicle in accordance with aspects of the disclosure.

FIG. 18 depicts an example of how the lateral uncertainty can be relevant to collision analysis in 2D. In this example, a polygon 1820 representative of an object A at is depicted at 3 different times: times t0, t1, t2. Here, the object A may be detected at time to at a location corresponding to a location of a polygon 1820-10 representative of the object A. The behavior modeling system 174 may predict that the object A will follow a trajectory 1830 such that the object at will at some point be at locations of polygons 1820-t1 and 1820-t2. Polygons 1840-L and 1840-R represent limits on lateral uncertainty for the location of the object A at time t1. These limits may be set by operators and may correspond to either locations where the lateral uncertainty is greater than some predetermined limit on the uncertainty (e.g. 99.9% or 0.99 or more or less) or some predetermined limit on a lateral distance for the uncertainty (e.g. 2 meters or more or less). For ease of understanding, the uncertainty for the location of the object at time t2 is not depicted.

In addition, vehicle 100 may be following a planned trajectory or alternatively, the planning system 168 may have generated the planned trajectory for the autonomous vehicle to follow. The area 1810 may represent a swept volume for vehicle 100 when following a planned trajectory and may be determined using the polygon 400 representative of vehicle 100 or a more complex polygon with additional vertices. As can be seen, the lateral uncertainty of the object may mean that the autonomous vehicle could collide with the object in a much wider area than the location of polygon 1820-t1. Such uncertainty may thus make determining a collision location (including entry and exit locations) for polygon 1820 at the location of the object at time t1 fairly inaccurate.

To address these shortcomings, the lateral uncertainty of an object may be modeled as a normal distribution with mean and standard deviation (sd) from the uncertainty output by the behavior modeling system 174. For instance, the uncertainty for an object's location (or rather the location of the polygon representative of the object) at different points along the predicted trajectory may be provided by the behavior modeling system 174.

Figure 19:
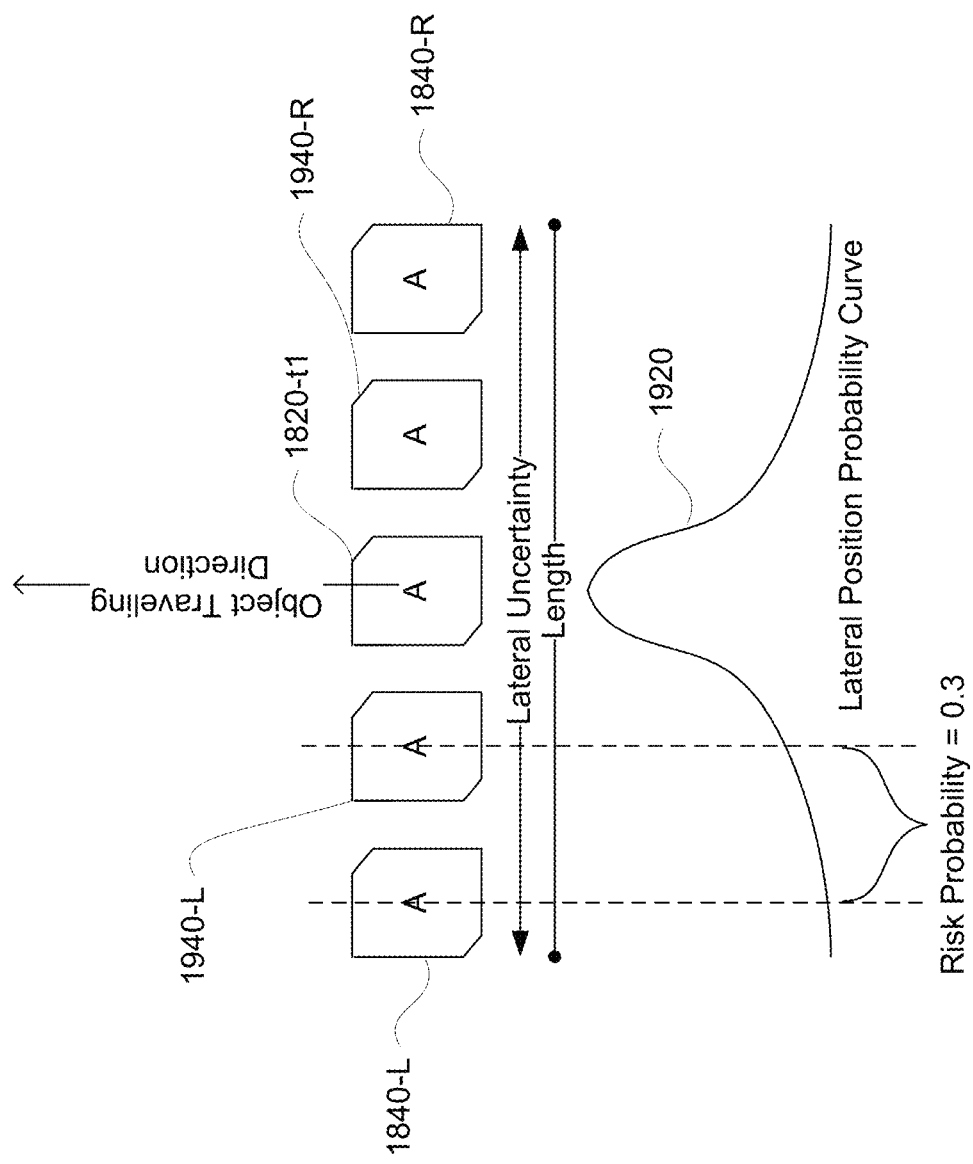
FIG. 19 is another example of lateral uncertainty for a polygon representative of an object in accordance with aspects of the disclosure.

Referring to FIG. 19, which represents lateral uncertainty for the object A for the location of polygon 1820-t1, lateral uncertainty increases moving away from the location of polygon 1820-t1 towards the location of polygon 1840-L and decreases moving away from the location of polygon 1840-L towards the location of polygon 1820-t1. Similarly, lateral uncertainty increases moving away from the location of polygon 1820-t1 towards the location of polygon 1840-R and decreases moving away from the location of polygon 1840-R towards the location of polygon 1820-t1. The distance between the outer edges of 1840-L and 1840-R may define a "length" of the lateral uncertainty given the limits on lateral uncertainty for the location of the object A at time t1. The curve 1920 represents a lateral position probability curve for object A at the time t2. The area under the curve 1920 provides the probability of the object being between any two possible locations. For example, between the left two locations of polygons 1840-L and 1940-L, the probability is 0.3.

A probability of overlap with the path of the autonomous vehicle 100 may be determined. In order to identify locations where the path of the autonomous vehicle is likely to intersect with the object, the computing devices 110 may convert the planned trajectory of the autonomous vehicle into a series of boxes representing the location of discrete points in time (e.g. the 2D or 3D path). Similarly, the computing devices 110 may convert the predicted trajectory for the object into a series of boxes representing a swept path for the object (e.g. the 2D or 3D path). The computing devices 110 may then search along the path of the autonomous vehicle to identify boxes (representing predicted locations) for the object that are within a predetermined distance, such as 10 meters or more or less, from the path of the object. In this regard, the computing devices 110 may identify a planned future location for the autonomous vehicle as well as a corresponding predicted future location of the object (i.e. the location of the identified box) that are within a predetermined distance from one another.

Distances between the object and the planned trajectory of the autonomous vehicle 100 may be determined by calculating the entry and exit distances between the object and some location of the autonomous vehicle on the planned trajectory of the autonomous vehicle for the identified planned future location for the autonomous vehicle. For example, d1 may represent a distance when the object enters an overlap with the planned trajectory of the autonomous vehicle, and d2 may represent a distance when the object exits an overlap with the planned trajectory of the autonomous vehicle. The probability of overlap may be determined from the cumulative distribution function between d1/sd and d2/sd. In this regard, d1 and d2 correspond to the bounds of an overlap region between the polygon representative of the object and the path of the autonomous vehicle.

Figure 20:
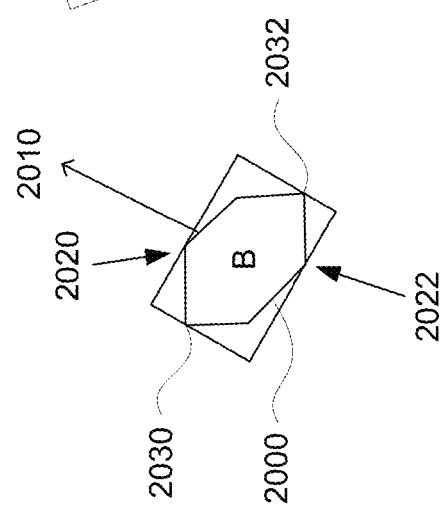
FIG. 20 is an example polygon representative of an object in accordance with aspects of the disclosure.

To determine the distances d1 and d2, or rather, the position of the polygon representative of the object when it will enter and exit the planned trajectory of the autonomous vehicle, the polygon of the object may be decomposed into front and rear polylines. Returning to FIG. 25, at block 2520 a front polyline for the polygon representative of the object is determined based on a heading and a contour of the object. A rear polyline for the polygon representative of the object may also be determined based on the contour of the object. To do so, the left-most and right-most points relative to the object's heading may be identified. This may be achieved using known techniques which may or may not include converting the coordinate system of the object to one that simplifies the identifications. For instance, FIG. 20 is an example polygon 2000 representative of an object B detected in the vehicle's environment. FIG. 20 also identifies the object's heading 2010 according to a predicted trajectory for object B. From the heading, the polygon representative of the object's front 2020 and rear 2022 may be identified, as well as a left-most point 2030 and right-most point 2032.

Figure 21:
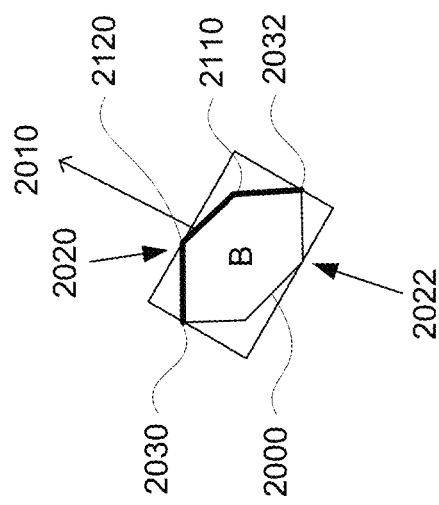
FIG. 21 is an example front polyline representation of an object in accordance with aspects of the disclosure.
Figure 22:
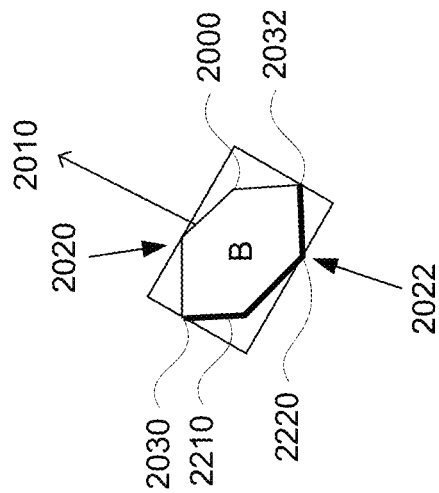
FIG. 22 is an example rear polyline representation of an object in accordance with aspects of the disclosure.

From these left-most and right-most points, the polygon may be divided into front and rear polylines as depicted in the example of FIGS. 21 and 22. For example, the front polyline 2110 corresponds to all vertices on the front 2020 of the polygon 2000 representative of object B between and including the left-most point 2030 and right-most point 2032. In addition, the rear polyline 2210 corresponds to all vertices on the rear 2022 of the polygon 2000 representative of object B between and including the left-most point 2030 and right-most point 2032. Each of the front polyline 2110 and rear polyline 2210 may actually represent front and rear width profiles for polygon representative of the object.

Returning to FIG. 25, at block 2530, coordinates of the front polyline are converted to the half-plane coordinate system. In addition, coordinates of the rear polyline may be converted to the half-plane coordinate system. In other words, each of the front and rear polylines may then be converted to half-plane coordinates. This may be done, for instance, by finding the polygon representative of the object's extreme points in half-plane's forward direction ("front") and reverse direction ("rear") with respect to the object's heading. In the example of FIG. 21, the object's front-most point is point 2120, and in FIG. 22, the object's rear-most point is point 2022. Turning to FIG. 23A, the front halfplane 2310 may be determined as a plane perpendicular to the heading 2010 that passes through the point 2120.

Figure 23B:
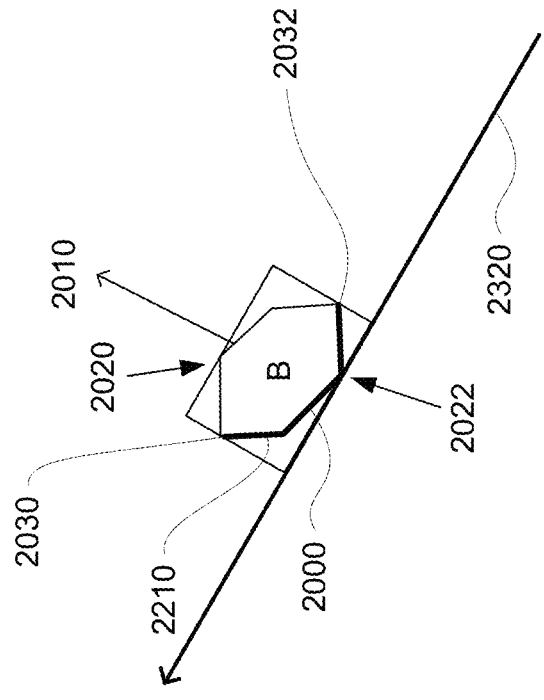
FIG. 23B is an example of a rear polyline representation of an object in half-plane coordinates in accordance with aspects of the disclosure.
Figure 23A:
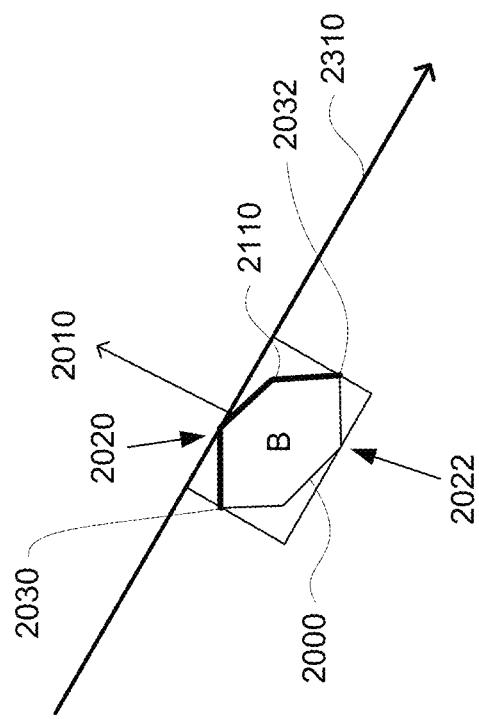
FIG. 23A is an example of a front polyline representation of an object in half-plane coordinates in accordance with aspects of the disclosure.

Turning to FIG. 23B, the rear halfplane 2320 may be determined as a plane perpendicular to the heading 2010 that passes through the point 2220. In addition, the identified planned future location of the autonomous vehicle may also be converted to each of the halfplane coordinate systems, e.g. front and rear, for the object. In other words, each identified planned future location of the autonomous is converted to the coordinates of the object polygon's front and rear halfplane coordinate systems given the expected.

Collision locations, or rather, an entry location and an exit location for each of the front and rear polylines may be determined. For instance, returning to FIG. 25, at block 2540, an entry location and an exit location between the front polyline and a polygon representative of the object are determined using the converted coordinates for the front and rear polylines as well as the converted coordinates for the identified planned future location of the autonomous vehicle. In addition, an entry location and an exit location between the rear polyline and the polygon representative of the object are determined based on the converted coordinates for the planned future location of the autonomous vehicle and using the converted coordinates for the front and rear polylines.

Each entry or exit location may correspond to a particular line segment of the front or rear polyline, which would collide with the autonomous vehicle (or rather, the planned trajectory of the autonomous vehicle) given the autonomous vehicle's current planned trajectory. While the entry location may identify where the autonomous vehicle will have a collision with an object, the exit location may identify how the autonomous vehicle can get out of a collision with a trajectory of the object. Determining entry and exit locations may involve mathematically "sliding" or "moving" the front and rear polylines along the half-plane direction to determine where the front or rear polyline would intersect with the path or at least some future predicted location of the autonomous vehicle as shown in the images below. For instance, as noted above, rather than being a "swept" volume or area, the path of the autonomous vehicle may be thought of as a plurality of discrete boxes or polygons representative of the autonomous vehicle at different positions. Thus, in some instances, whether the object is likely to intersect with the autonomous vehicle for a given trajectory may be determined by using a box or more complex polygon representative of the autonomous vehicle rather than the path.

In practice, this may involve subtracting the position or x coordinates between two points (one on a polyline and one on the path) in order to determine how far the polyline representative of the object (or the object) has to move (or slide along the half-plane) to have a collision with the autonomous vehicle. An entry location may correspond to a point on or a particular line segment of the polyline which would collide with the autonomous vehicle given the autonomous vehicle's current or a future trajectory. An exit location may correspond to a point on or a particular line segment of the polyline having a most etreem x-value which would collide with the autonomous vehicle given the autonomous vehicle's current or a future trajectory.

Figure 24:
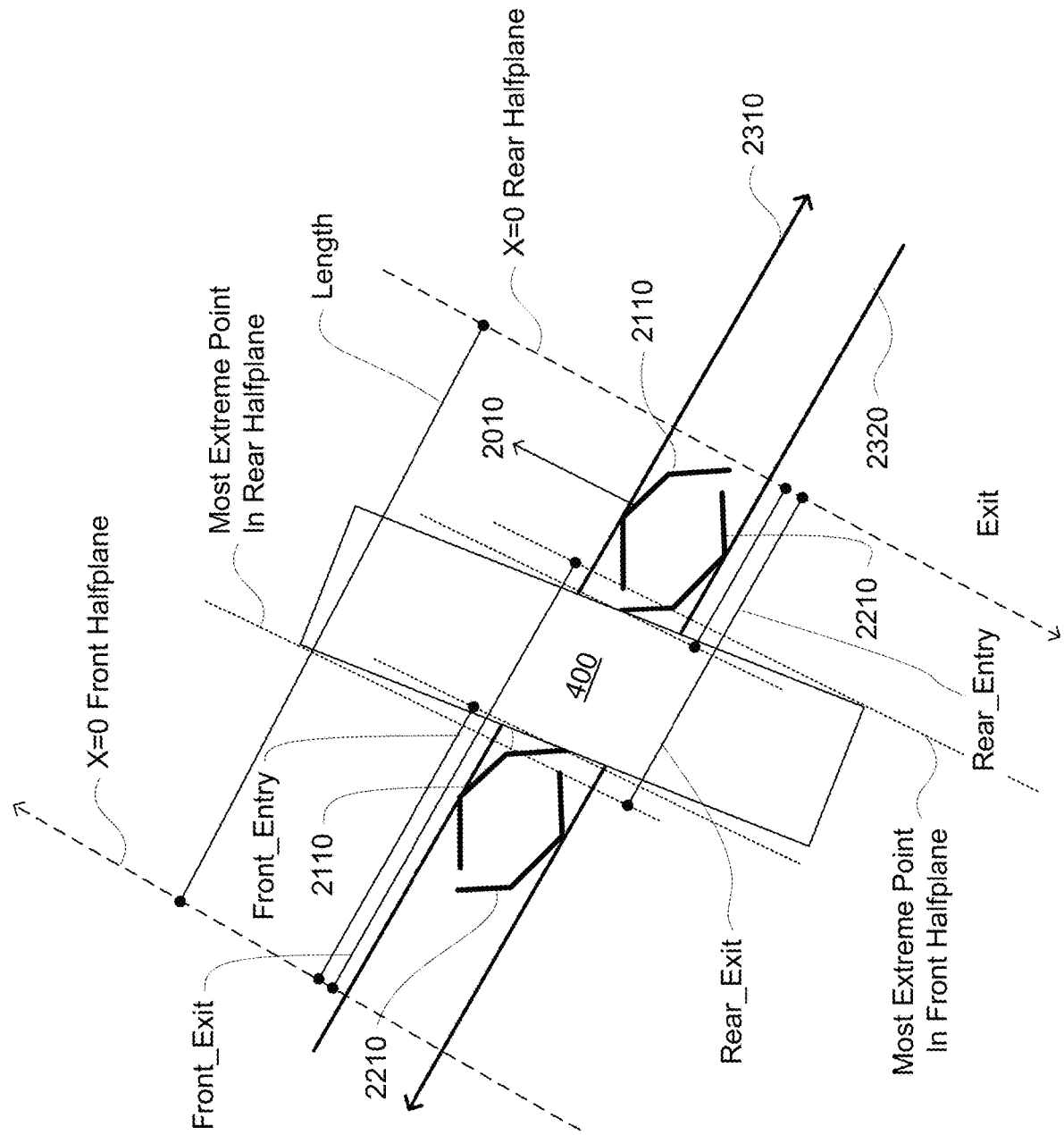
FIG. 24 is an example for determining collision locations, including entry and exit locations, in accordance with aspects of the disclosure.

Turning to the example of FIG. 24, the polygon 400 representative of the vehicle 100 is depicted at an identified planned future location of the autonomous vehicle along the autonomous vehicle's planned trajectory using converted coordinates and with respect to both the front halfplane 2310 and the rear halfplane 2320 for the object B. In this regard, the distance between the X=0 values for each of the front and rear halfplanes or the Length 2410 corresponds to the "length" of the lateral uncertainty given the limits on lateral uncertainty for the location of the object B at a time when the vehicle is at the planned future location as described in the example above. Again, by mathematically sliding the front polyline along the front halfplane and rear halfplane (starting at X=0 for each of the front and rear halfplanes), entry locations may be determined. Each entry location may correspond to a line segment or point on the front or rear halfplane where the front or rear polyline representative of the object would initially make contact with the polygon representative of the vehicle. In the example of FIG. 24, the distance Front_Entry represents the distance between the X=0 along the front halfplane 2310 and the line segment or point on the front polyline 2110 where the front polyline 2110 would initially make contact with the polygon 400. The distance Rear_Entry represents the distance between the X=0 along the rear halfplane 2310 and the line segment or point on the rear polyline 2210 where the rear polyline 2210 would initially make contact with the polygon 400.

When determining the exit locations, rather than using the point where the front or rear polyline would no longer make contact with the polygon, the most extreme points or x-coordinates in of the vehicle in the front or rear halfplane coordinate systems, respectively, are used. In the example of FIG. 24, the distance Front_Exit represents the distance between the X=0 along the front halfplane 2310 and the line segment or point on the front polyline 2110 where the front polyline 2110 would last intersect with the most extreme x-coordinate of the polygon 400 in the front halfplane coordinate system after being mathematically slid along the rear halfplane. The distance Rear Exit represents the distance between the X=0 along the rear halfplane 2310 and the line segment or point on the rear polyline 2210 where the rear polyline 2210 would last intersect with the most extreme x-coordinate of the polygon 400 in the front halfplane coordinate system after being mathematically slid along the rear halfplane.

The distances d1 and d2 may then be determined from the entry and exit locations for the front and rear half planes. For example, d1 may be determined by taking the minimum x-coordinate value of the entry location of the front polyline and the x-coordinate value of the exit location of the rear polyline projected to front halfplane. D2 may be determined by taking the maximum x-coordinate value of the exit location of the front polyline and the x-coordinate of the entry location of the rear polyline projected to the front polyline. Put differently because the coordinates of the polygon and the polylines are in the half-plane coordinate system, the distances d1 and d2 may be determined using the equation: {d1=min(Front_Entry, Length−Rear_Entry}, d2=max(Front_Exit, Length−Rear_exit)}, where Front_Entry represents the x-coordinate or distance for the entry location for the front polyline, Rear_Entry represents the x-coordinate or distance for the entry location for the rear polyline, Front_Exit represents the x-coordinate or distance for the exit location for the front polyline, Rear_Exit represents the x-coordinate of the exit location for the rear polyline, and Length represents the aforementioned "length" of the lateral uncertainty given the limits on lateral uncertainty for the location of an object at a time when the vehicle is at the planned future location. These values, d1 and d2, may then be used to determine the probability of overlap (e.g. a collision) at the given location as described above.

In the examples described herein, the particular locations of the polygon 400 representation of the object B are discrete locations of the autonomous vehicle 100 according to a planned trajectory where the planned trajectory of the autonomous vehicle and the predicted trajectory of the object overlap. As such, if there are multiple locations at which the planned and projected trajectories would overlap, the aforementioned determinations of collision locations and probabilities of overlap may be performed for such multiple locations.

Returning to FIG. 25, at block 2550, the autonomous vehicle is controlled in the autonomous driving mode to avoid a collision with the object based on the entry location and the exit location. Once again, the collision locations may be useful when a vehicle's computing devices decide to avoid or even overtake an object. For instance, the distances d1 and d2 may be used to determine a probability of overlap as described above. Once the probability of overlap is determined, the autonomous vehicle's computing devices can use this information to determine how to better control the speed of the autonomous vehicle (e.g. drive faster or slower) in an autonomous driving mode in order to avoid the object. In some instances, the autonomous vehicle may even generate a new trajectory.

Although the features and examples herein relate to determining collision locations for autonomous vehicles, such features may also be utilized for non-autonomous vehicles, or vehicles which operate in only manual or semiautonomous driving modes, or for autonomous vehicles which are not operating in a fully autonomous driving mode. For instance, n semiautonomous or manual driving modes, this method can help to evaluate or predict the probabilistic risk of the future driving trajectory, which can also enhance the safety of the system.

Figure 26:
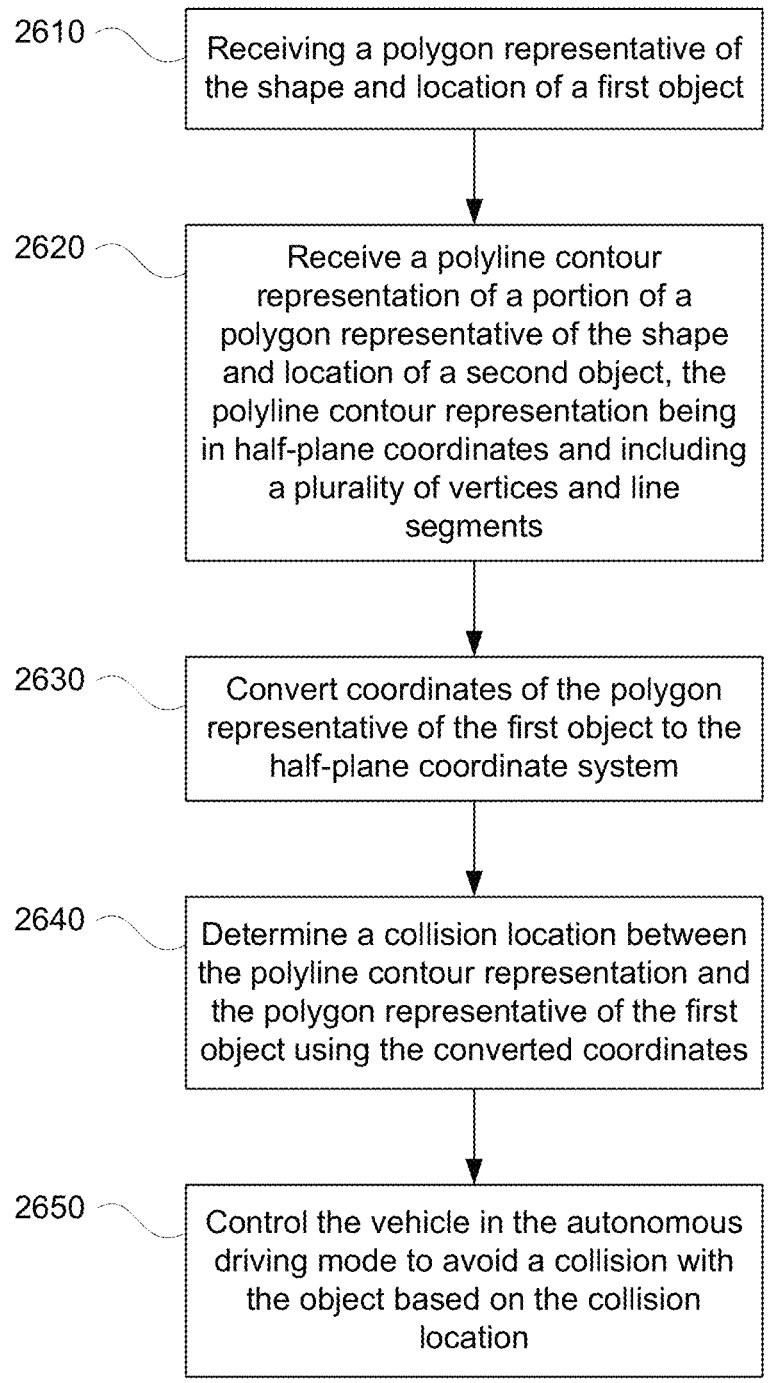
FIG. 26 is an example flow diagram in accordance with aspects of the disclosure.

FIG. 26 is another example flow diagram 2600 in accordance with aspects of the disclosure which may be performed by one or more processors of one or more computing devices, such as processors 120 of computing devices 110, in order to maneuver a vehicle having an autonomous driving mode. At block 2610, a polygon representative of the shape and location of a first object is received. At block 2620, a polyline contour representation of a portion of a polygon representative of the shape and location of a second object is received. The polyline contour representation is in half-plane coordinates and includes a plurality of vertices and line segments. At block 2630, coordinates of the polygon representative of the first object are converted to the half-plane coordinate system. At block 2640, a collision location between the polyline contour representation and the polygon representative of the first object is determined using the converted coordinates. At block 2650, the autonomous vehicle is then controlled in the autonomous driving mode to avoid a collision based on the collision location. In this example, the first object may be the autonomous vehicle, and the second object is an object in an environment of the autonomous vehicle. Alternatively, the second object may be the autonomous vehicle, and the first object is an object in an environment of the autonomous vehicle. In addition, the collision location may include an entry location for the collision as well as an exit location for the collision.

The features described herein may provide an efficient, yet realistic representation of objects for collision analysis. For instance, the features described herein may allow for an efficient and accurate method to compute the overlapping probability between an object and an autonomous vehicle's trajectory. In addition, in the case of a polyline representation of the autonomous vehicle, because the representation of the autonomous vehicle is not generalized to a two-dimensional rectangle that is larger than the actual dimensions of the autonomous vehicle, this can significantly reduce the swept volume of the autonomous vehicle, which in turn, may allow the autonomous vehicle to pass through more narrow passages and closer to other objects. As noted above, the goal of collision detection is ultimately to be conservative and detect any possible collision. However, using a polyline representation may allow for the calculation of larger distances between the autonomous vehicle and other objects, without compromising the nature of the conservative estimate.

In addition, because the polyline contour representation need only correspond to half of a vehicle and only a portion of that (before or after the peak) is needed when performing the collision analysis, this too can significantly reduce memory and processing resources. As noted above, the polyline contour representation also allows for a determination of which portion of the autonomous vehicle will be involved in a collision (e.g., collides with mirror or bumper) rather than simply a point on a rectangle which may or may not actually correspond to a physical point on the autonomous vehicle. Further, because the monotonicity of the y coordinate of the polyline contour representation, once it is known how deep an object overlaps with the autonomous vehicle's trajectory, which line segment to use for the collision analysis can be determined quickly. In addition to vehicles and real-time decision making, the features described herein may also be useful for objects other than vehicles including virtual representations of objects, such as simulations including testing circumstances as well as video games. For instance, the features described herein may be used to determine collision locations and exit locations for those virtual objects making the simulations themselves more efficient.

When used in conjunction with actual vehicles, because the polyline contour representation is more nuanced that a rectangular polygon representative of a vehicle or an object in the vehicle's environment, the features described herein may effectively increase the calculated distances between the autonomous vehicle and other objects which can also reduce the likelihood of false positive collisions with other objects, reduce the likelihood of a vehicle becoming stranded (unable to proceed) because it is falsely blocked by another object, and reduce occlusions caused by other objects as the autonomous vehicle may be able to get closer to or nudge around the object. All of these benefits, in turn, can enable the autonomous vehicle to better maneuver around objects, in some cases, drive faster, and also reduce the need for evasive (or otherwise uncomfortable) maneuvers which can improve overall driving comfort for passengers.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a vehicle having an autonomous driving mode, the method comprising:
   receiving, by one or more processors, a first polygon representative of a shape and location of a first object;
   receiving, by the one or more processors, a partial representation of a second polygon representative of a shape and location of a second object;
   determining, by the one or more processors, at least one entry location of a potential collision between the partial representation of the second polygon and the first polygon;
   determining, by the one or more processors, at least one exit location that identifies how to get out of the potential collision; and
   controlling, by the one or more processors, the vehicle in the autonomous driving mode to avoid a collision with an object based on the at least one entry location and the at least one exit location.

2. The method of claim 1, wherein the first object is the vehicle, and the second object is an object in an environment of the vehicle.

3. The method of claim 1, wherein the second object is the vehicle, and the first object is an object in an environment of the vehicle.

4. The method of claim 1, wherein the at least one entry location corresponds to a point on or a particular line segment of the partial representation of the second polygon.

5. The method of claim 1, wherein the at least one entry location and the at least one exit location are determined using converted coordinates for front and rear polylines of the partial representation of the second polygon.

6. The method of claim 1, wherein the partial representation of the second polygon is a polyline contour representation of a portion of the second polygon and includes a plurality of vertices and line segments.

7. A system for controlling a vehicle having an autonomous driving mode, the system comprising one or more processors:
   receive a first polygon representative of a shape and location of a first object;
   receive a partial representation of a second polygon representative of a shape and location of a second object;

determine at least one entry location of a potential collision between the partial representation of the second polygon and the first polygon;
determine at least one exit location that identifies how to get out of the potential collision; and
control the vehicle in the autonomous driving mode to avoid a collision with an object based on the at least one entry location and the at least one exit location.

8. The system of claim 7, wherein the first object is the vehicle, and the second object is an object in an environment of the vehicle.

9. The system of claim 7, wherein the second object is the vehicle, and the first object is an object in an environment of the vehicle.

10. The system of claim 7, wherein the at least one entry location corresponds to a point on or a particular line segment of the partial representation of the second polygonfor.

11. The system of claim 7, wherein the at least one entry location and the at least one exit location are determined using converted coordinates for front and rear polylines of the partial representation of the second polygon.

12. The system of claim 7, further comprising the vehicle, wherein the vehicle includes a perception system configured to generate the first polygon and the partial representation.

13. The system of claim 7, wherein the partial representation of the second polygon is a polyline contour representation of a portion of the second polygon and includes a plurality of vertices and line segments.

14. A non-transitory recording medium on which instructions are stored, the instructions, when executed by one or more processors, cause the one or more processors to perform a method of controlling a vehicle having an autonomous driving mode, the method comprising:

receiving a first polygon representative of a shape and location of a first object;
receiving a partial representation of a second polygon representative of a shape and location of a second object;
determining at least one entry location of a potential collision between the partial representation of the second polygon and the first polygon;
determining at least one exit location that identifies how to get out of the potential collision; and
control the vehicle in the autonomous driving mode to avoid a collision with an object based on the at least one entry location and the at least one exit location.

15. The medium of claim 14, wherein the first object is the vehicle, and the second object is an object in an environment of the vehicle.

16. The medium of claim 14, wherein the second object is the vehicle, and the first object is an object in an environment of the vehicle.

17. The medium of claim 14, wherein the at least one entry location corresponds to a point on or a particular line segment of the partial representation of the second polygon.

18. The medium of claim 14, wherein the at least one entry location and the at least one exit location are determined using converted coordinates for front and rear polylines of the partial representation of the second polygon.

19. The medium of claim 14, wherein the partial representation of the second polygon is a polyline contour representation of a portion of the second polygon.

20. The medium of claim 19, wherein the polyline contour representation includes a plurality of vertices and line segments.

* * * * *

UNITED STATES PATENT AND TRADEMARK OFFICE
CERTIFICATE OF CORRECTION

Page 1 of 1

PATENT NO.         : 12,337,835 B2
APPLICATION NO.    : 18/588333
DATED              : June 24, 2025
INVENTOR(S)        : Dong Li, Ioan-Alexandru Sucan and Victor Puchkarev It is certified that error appears in the above-identified patent and that said Letters Patent is hereby corrected as shown below:

In the Claims

Claim 10, Column 31, Lines 16 and 17:
Now reads: "the second polygonfor" should read -- the second polygon --

Signed and Sealed this
Fifth Day of August, 2025

Coke Morgan Stewart
*Acting Director of the United States Patent and Trademark Office*